US010379422B2

(12) United States Patent
Endo

(10) Patent No.: US 10,379,422 B2
(45) Date of Patent: Aug. 13, 2019

(54) POSITION DETECTING APPARATUS AND IMAGE STABILIZATION APPARATUS TO WHICH POSITION DETECTING APPARATUS IS APPLIED

(71) Applicant: OLYMPUS CORPORATION, Hachioji-shi, Tokyo (JP)

(72) Inventor: Shuhei Endo, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/906,764

(22) Filed: Feb. 27, 2018

(65) Prior Publication Data

US 2018/0329275 A1  Nov. 15, 2018

(30) Foreign Application Priority Data

May 12, 2017 (JP) ................. 2017-095779

(51) Int. Cl.
*G03B 5/00* (2006.01)
*G01D 5/20* (2006.01)
*H04N 5/232* (2006.01)
*G01D 5/14* (2006.01)

(52) U.S. Cl.
CPC ............... *G03B 5/00* (2013.01); *G01D 5/20* (2013.01); *G01D 5/145* (2013.01); *G03B 2205/0007* (2013.01); *G03B 2205/0069* (2013.01); *G03B 2217/005* (2013.01); *H04N 5/23287* (2013.01)

(58) Field of Classification Search
USPC .......................................................... 396/55
See application file for complete search history.

(56) References Cited

U.S. PATENT DOCUMENTS

| 8,446,672 | B2* | 5/2013 | Omi ..................... G02B 27/646 |
| | | | 359/554 |
| 9,036,260 | B2* | 5/2015 | Sugawara ................ G02B 7/08 |
| | | | 359/557 |
| 2008/0219653 | A1* | 9/2008 | Shioda ..................... G03B 5/00 |
| | | | 396/55 |

FOREIGN PATENT DOCUMENTS

JP        2010015107 A      1/2010

* cited by examiner

*Primary Examiner* — Clayton E. LaBalle
*Assistant Examiner* — Warren K Fenwick
(74) *Attorney, Agent, or Firm* — Holtz, Holtz & Volek PC

(57) ABSTRACT

A position detecting apparatus includes: a fixed member in which a magnet is disposed, a movable member including a movable barrel in which a coil and an optical element are disposed, the movable barrel being driven in a direction perpendicular to a direction along an optical axis of the optical element with respect to the fixed member by a VCM driving section, and a magnetism detecting member disposed in the movable member, the magnetism detecting member detecting a change in a magnetic flux density of the magnet at a time when the movable member is driven. The magnetism detecting member is disposed, in a plane perpendicular to a direction along the optical axis, in a position where a magnetic flux density of the coil does not affect the change in the magnetic flux density due to the magnet when an electric current is fed to the coil.

14 Claims, 13 Drawing Sheets

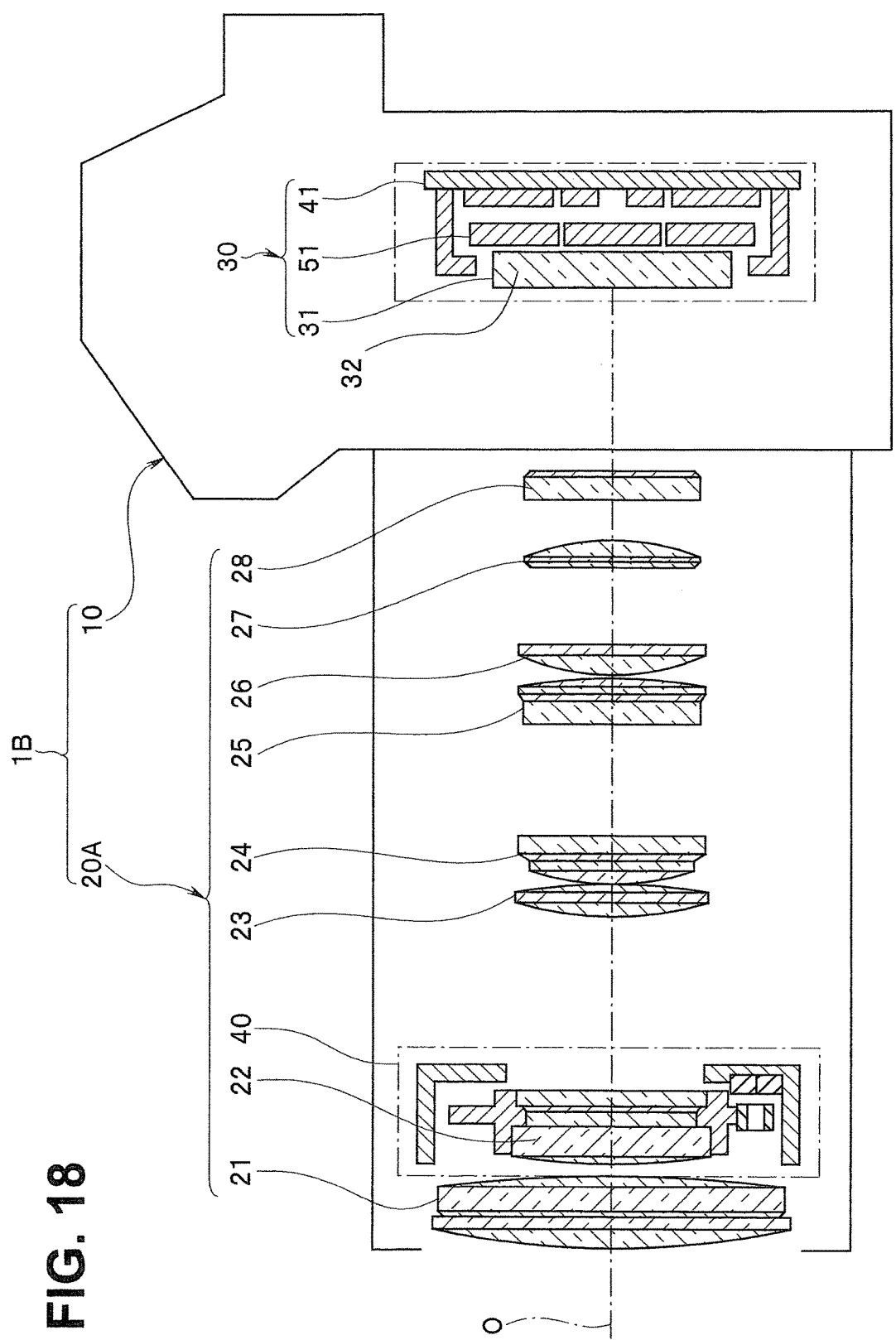

POSITION DETECTING APPARATUS AND IMAGE STABILIZATION APPARATUS TO WHICH POSITION DETECTING APPARATUS IS APPLIED

CROSS REFERENCE TO RELATED APPLICATION

This application claims the benefit of Japanese Patent Application No. 2017-095779 filed in Japan on May 12, 2017, the contents of which are incorporated herein by this reference.

BACKGROUND OF THE INVENTION

1. Field of the Invention

The present invention relates to a position detecting apparatus that is mounted on an image pickup apparatus or a lens barrel attached to the image pickup apparatus and is applied to an optical image stabilization apparatus in which a driving mechanism of a voice coil motor (VCM) type is used.

2. Description of Related Art

There has been generally put to widespread practical use an image pickup apparatus such as a digital camera and a video camera including an image display apparatus such as a liquid crystal display (LCD) apparatus or an organic EL display apparatus that is capable of sequentially converting optical images formed by an image pickup optical system into image signals using a photoelectric conversion element or the like (hereinafter referred to as image pickup device) and recording the image signals obtained by the conversion in a recording medium as image data of a predetermined faun and reproduces and displays the image data recorded in the recording medium as images.

In the image pickup apparatus of this conventional type, there have been proposed and put to practical use various image stabilization apparatuses for detecting and eliminating very small movements (so-called camera-shake, etc.) of the image pickup apparatus that occurs because an apparatus main body is unstably held when a user holds and uses the apparatus main body by hand or the like.

For example, as a conventional image pickup apparatus, there is an image pickup apparatus to which a lens barrel is applied, the lens barrel including an optical image stabilization apparatus of a so-called lens shift type configured to be capable of detecting a camera-shake or the like, moving a part of optical members of an image pickup optical system in a direction for eliminating the camera-shake or the like on a surface substantially orthogonal to an optical axis of the image pickup optical system (in a shift direction), and rotating the optical members in a pitch direction and a yaw direction respectively around two axes (an X axis and a Y axis) orthogonal to the optical axis of the image pickup optical system as a center.

Similarly, as a conventional image pickup apparatus, there is an image pickup apparatus including an optical image stabilization apparatus of a so-called image pickup device shift type configured to be capable of detecting a camera-shake or the like, shifting an image pickup device in a direction for eliminating the camera-shake or the like on a surface orthogonal to an optical axis of an image pickup optical system, and performing pitch or yaw rotation around an X axis and a Y axis orthogonal to an optical axis of the image pickup optical system and rotation around the optical axis O.

In the optical image stabilization apparatus of this type, as a driving mechanism for moving an optical lens or the image pickup device in the direction orthogonal to the optical axis or around the optical axis, for example, there has been generally put to practical use a driving mechanism in which a magnetic actuator, a vibration-type linear actuator, or the like of a voice coil motor (VCM) type is used.

On the other hand, in order to perform control for moving a part of the optical members of the image pickup optical system or the image pickup device, in general, the optical image stabilization apparatus of this type includes a position detecting apparatus that detects a position of an optical member that is moved during image stabilization or a movable barrel member that holds the image pickup device.

As a conventional position detecting apparatus applied to an image stabilization apparatus, there is, for example, a position detecting apparatus of a magnetism detection type including a member (a magnet, etc.) that generates magnetism and a magnetism detecting member (a Hall element, etc.) that detects a magnetic field of the magnet.

For example, a conventional image stabilization apparatus disclosed in Japanese Patent Application Laid-Open Publication No. 2010-15107 includes a driving mechanism of a voice coil motor type including a coil, a yoke, and a magnet and a position detecting apparatus of a magnetism detection type including a magnet and a magnetism detecting member (a Hall element).

SUMMARY OF THE INVENTION

A position detecting apparatus according to an aspect of the present invention includes: a fixed member in which one of a magnet and a coil is disposed; a movable member including a movable barrel in which another of the magnet and the coil and an optical element are disposed, the movable barrel being driven in a direction perpendicular to a direction along an optical axis of the optical element with respect to the fixed member by a VCM driving section including the magnet and the coil; and a magnetism detecting member disposed in the movable member or the fixed member in which the coil is disposed, the magnetism detecting member detecting a change in a magnetic flux density of the magnet at a time when the movable member is driven. The magnetism detecting member is disposed, in a plane perpendicular to a direction along the optical axis, in a position where magnetic flux density of the coil does not affect the change in the magnetic flux density due to the magnet when an electric current is fed to the coil.

A position detecting apparatus according to another aspect of the present invention includes: a fixed member in which one of a set of magnets disposed to be opposite to each other and a set of coils disposed to be opposite to each other is disposed; a movable member in which another of the set of magnets disposed to be opposite to each other and the set of coils disposed to be opposite to each other and an optical element are disposed, the movable member moving in a plane orthogonal to an optical axis of the optical element; and a set of magnetism detecting members disposed in the movable member or the fixed member in which the set of coils is disposed, the set of magnetism detecting members detecting a change in a magnetic flux density of each of magnets of the set of magnets when the movable member is driven. The set of magnetism detecting members is disposed on a first imaginary line on which a sum of magnetic flux densities in a direction along the optical axis respectively generated from the coils of the set of coils is zero when electric currents in opposite directions to each other are fed to the set of coils.

An image stabilization apparatus according to an aspect of the present invention includes the position detecting apparatus.

Benefits of the present invention will become more evident from the following detailed explanation.

BRIEF DESCRIPTION OF THE DRAWINGS

FIG. 18 is a conceptual diagram showing a schematic configuration of still another form of the image pickup apparatus to which the present invention is applied.

DETAILED DESCRIPTION OF THE PREFERRED EMBODIMENT

The present invention is explained below with reference to an embodiment shown in the figures. Respective drawings referred to in the following explanation are schematically shown. Dimensional relations, scales, and the like of respective members are differentiated and shown for each of components in order to show the respective components in sizes recognizable on the drawings. Therefore, the present invention is not limited to only forms shown in the figures concerning the quantities of the respective components, the shapes of the respective components, ratios of the sizes of the respective components, a relative positional relation among the respective components, and the like described in the respective drawings.

A position detecting apparatus of the present invention is a position detecting apparatus applied in an optical image stabilization apparatus mounted, for example, in a main body of an image pickup apparatus that acquires image data or in a lens barrel attached to the image pickup apparatus.

An embodiment of the present invention explained below illustrates a position detecting apparatus applied to an optical image stabilization apparatus (hereinafter simply abbreviated as image stabilization apparatus) mounted on a main body of an image pickup apparatus.

Note that, in this embodiment, an optical axis in an image pickup optical system of a lens barrel attached to the image pickup apparatus is represented by a sign O. In a direction along the optical axis O, a side opposite to the front surface of the image pickup apparatus to which the lens barrel is attached, that is, a side on which an object is present is referred to as front. In the direction along the optical axis O, a side on which the image pickup apparatus with the lens barrel attached is present, that is, a side on which an image pickup device in the image pickup apparatus is provided is referred to as rear. The optical axis O of the image pickup optical system is disposed to pass substantially the center of a light receiving surface of the image pickup device. The light receiving surface of the image pickup device is disposed on a surface parallel to a surface orthogonal to the optical axis O of the image pickup optical system.

[Embodiment]

Figure 1:
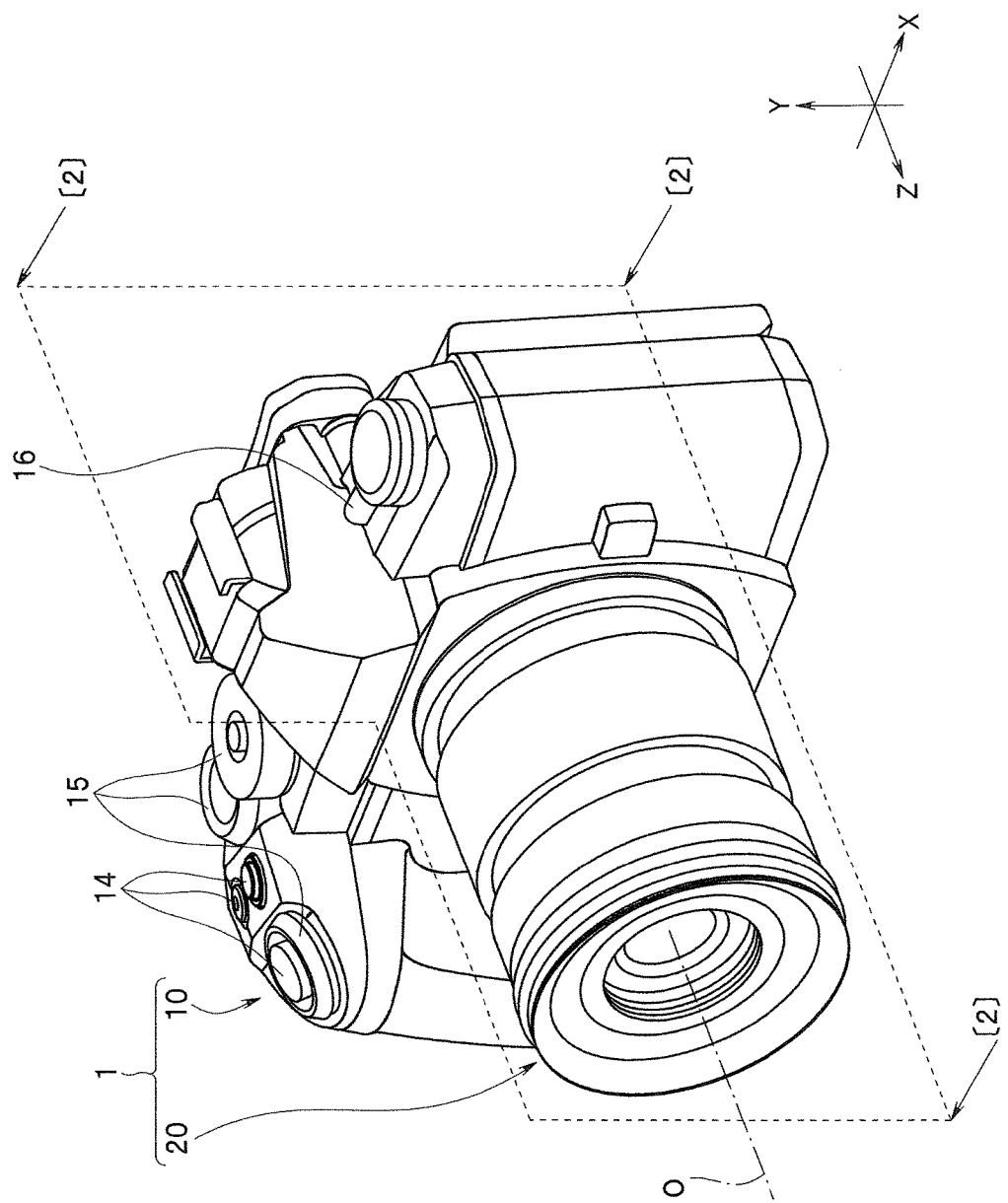
FIG. 1 is an exterior perspective view showing an image pickup apparatus on which an image stabilization apparatus is mounted, with a position detecting apparatus in an embodiment of the present invention applied to the image stabilization apparatus.
Figure 2:
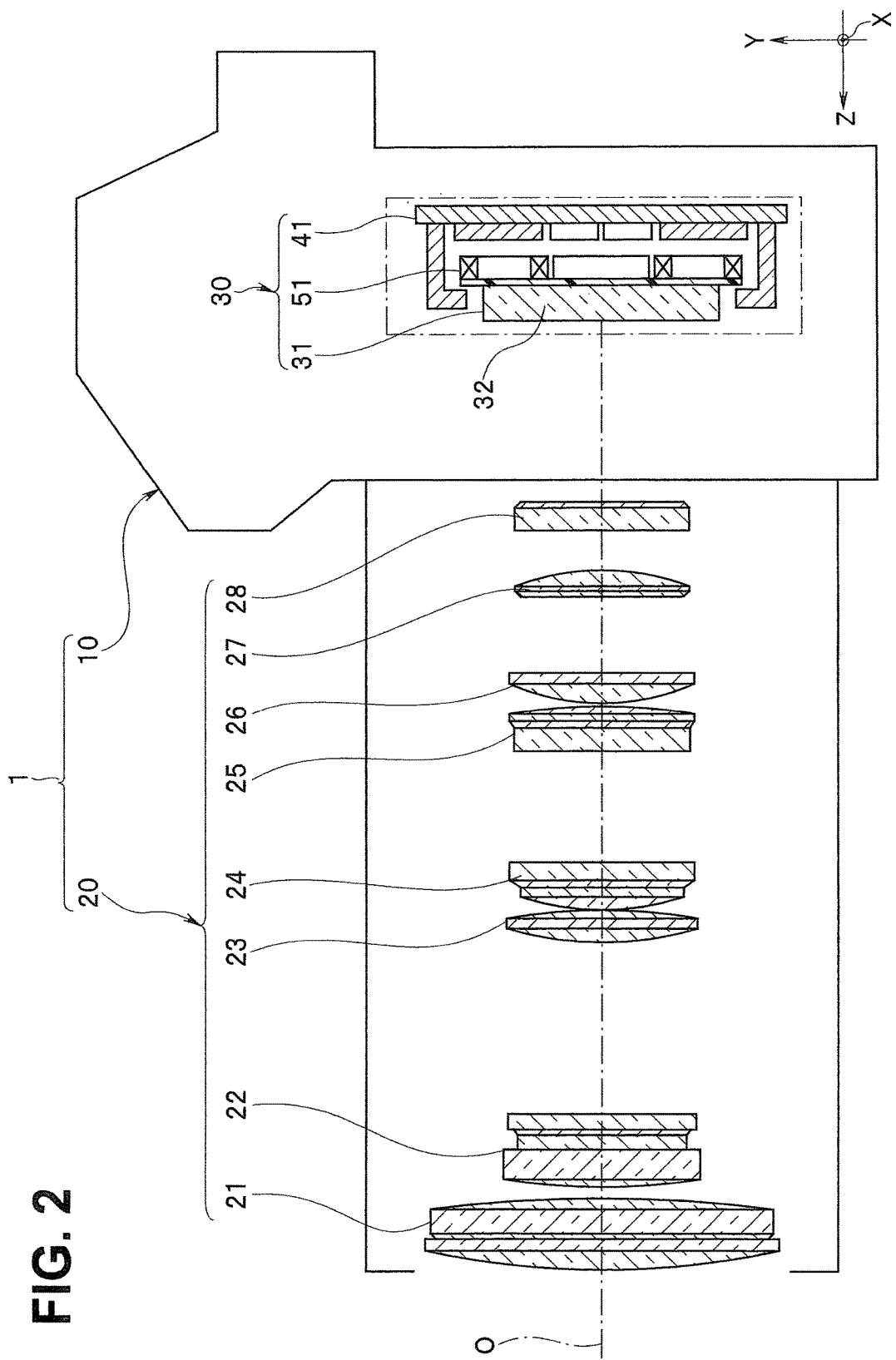
FIG. 2 is a conceptual diagram showing a longitudinal cross section of the image pickup apparatus shown in FIG. 1 taken along a cut section indicated by [2] in FIG. 1 and showing a schematic configuration of an internal structure of the image pickup apparatus and a lens barrel attached to the image pickup apparatus.

FIG. 1 is an exterior perspective view showing an image pickup apparatus on which an image stabilization apparatus is mounted, with a position detecting apparatus in an embodiment of the present invention applied to the image stabilization apparatus. FIG. 2 is a conceptual diagram showing a longitudinal cross section of the image pickup apparatus shown in FIG. 1 taken along a cut section indicated by [2] in FIG. 1 and showing a schematic configuration of an internal structure of the image pickup apparatus and a lens barrel attached to the image pickup apparatus. Note that, in FIG. 2, to avoid complication of the drawing, illustration of constituent members not directly related to the present invention is omitted. Internal configurations of respective units are simplified and shown.

Note that an arrow indicated by a sign Z in FIG. 1 indicates an axis parallel to the optical axis O. In the following explanation, the axis is referred to as Z axis. An arrow indicated by a sign Y in FIG. 1 indicates an axis orthogonal to the optical axis O (the Z axis) and parallel to the vertical direction. In the following explanation, the axis is referred to as Y axis. An arrow indicated by a sign X in FIG. 1 indicates an axis orthogonal to the optical axis O (the Z axis) and the Y axis and parallel to the horizontal direction. In the following explanation, the axis is referred to as X axis. A light receiving surface of the image pickup device is disposed to be parallel to a surface including the X axis and the Y axis (referred to as XY plane).

First, before explaining a detailed configuration of the image stabilization apparatus to which the position detecting apparatus in the embodiment of the present invention is applied, a schematic configuration of the image pickup apparatus on which the image stabilization apparatus is mounted is explained below with reference to FIGS. 1 and 2.

An image pickup apparatus 1 is an image pickup apparatus of a general form configured to be capable of photoelectrically converting, using a solid-state image pickup device (hereinafter simply referred to as image pickup device), an optical image generated by an image pickup optical system including a plurality of optical lenses, converting an image signal obtained by the image pickup device into digital image data representing a still image or a movie, recording the digital image data generated in this way in a storage medium, and reproducing and displaying the still image or the movie on a display apparatus on the basis of the digital image data recorded in the storage medium.

The image pickup apparatus 1 includes an apparatus main body 10 and a lens barrel 20. In this case, the apparatus main body 10 and the lens barrel 20 may be configured to be separable or may be integrally configured.

That is, the image pickup apparatus 1 may be an image pickup apparatus of a so-called lens replacement type configured to be capable of selecting one of a plurality of lens barrels 20 of different types and attaching the lens barrel 20 to the apparatus main body 10 or may be an image pickup apparatus of a so-called lens integral type in which the lens barrel 20 is integrally attached to the front surface of the apparatus main body 10.

The apparatus main body 10 in the image pickup apparatus 1 includes a housing that houses various constituent units configuring the image pickup apparatus 1 inside the housing and a plurality of operation members respectively disposed in predetermined positions on the outer surface of the housing.

As the various constituent units housed in the housing of the apparatus main body 10, for example, besides an image stabilization apparatus 30 (see FIG. 2) on which an image pickup unit 31 including the image pickup device is mounted, although not shown in FIG. 2, there are a finder apparatus, a shutter mechanism, and a plurality of electric boards.

Although not shown in FIG. 2, as the shutter mechanism, for example, a shutter mechanism of a focal plane type provided on the front surface side of the light receiving surface of the image pickup device is applied. Note that, as the shutter mechanism, a so-called lens shutter mechanism or the like of a form disposed inside the lens barrel 20 may be applied separately from the shutter mechanism of the form disposed in the apparatus main body 10.

Further, as other constituent units included in the apparatus main body 10, there are a display apparatus (not shown in FIG. 2) and the like. The display apparatus is disposed on the rear surface side of the housing of the apparatus main body 10.

The display apparatus includes a display panel that displays an image on the basis of image data acquired by the image pickup device or image data recorded in a not-shown recording medium and displays a selection display screen and the like for performing various kinds of setting.

Furthermore, a plurality of operation members are provided outside the housing of the apparatus main body 10. As the plurality of operation members, as shown in FIG. 1, there are a pressing-type operation member 14 for performing shutter release, respective setting changes, and the like, a rotation-type operation member 15 for performing setting switching operation, mode selection operation, and the like, a lever-type operation member 16 for performing, for example, ON/OFF operation of a power supply, and the like. Besides, there are a slide-type operation member and the like for performing other kinds of operation.

On the other hand, the lens barrel 20 attached to the image pickup apparatus 1 is formed into, for example, a cylindrical shape as a whole. In the lens barrel 20, the following units are included: an image pickup optical system including a plurality of image pickup lens groups (21 to 28; see FIG. 2) including a plurality of optical members, a plurality of lens holding members (not shown in FIG. 2) that respectively hold the plurality of image pickup lens groups configuring the image pickup optical system, and a focus driving mechanism, a zoom driving mechanism, and the like (not shown in FIG. 2) that advance and retract a predetermined image pickup lens group and a holding member (not shown in FIG. 2), which holds the predetermined image pickup lens group, in a direction along the optical axis O in order to perform a focus adjusting operation and a magnifying operation.

The lens barrel 20 is disposed on the front surface side of the apparatus main body 10. In this case, the lens barrel 20 may be of a faun fixed to the apparatus main body 10 (a lens integral type) or may be of a form detachably attachable to the apparatus main body 10 (a lens replacement type).

In a state in which the lens barrel 20 is disposed in a predetermined part on the front surface of the apparatus main body 10, an optical image formed by the image pickup optical system of the lens barrel 20 is formed on the light receiving surface of the image pickup device of the image pickup unit 31 in the apparatus main body 10.

Therefore, the disposition of the lens barrel 20 with respect to the apparatus main body 10 is specified such that the optical axis O of the image pickup optical system of the lens barrel 20 and a substantial center portion of the light receiving surface of the image pickup device of the image pickup unit substantially coincide.

As shown in FIG. 2 and as explained in detail below, the image stabilization apparatus 30 in this embodiment is an assembly (a constituent unit) for performing image stabilization processing by moving a movable section 51, which integrally holds the image pickup unit 31, in a plane orthogonal to the optical axis O (the XY plane) with respect to a fixed section 41 (details are explained below).

It is assumed that the other components of the image pickup apparatus 1 are substantially the same as the components of the conventional image pickup apparatus of the same form. More detailed explanation of the components is omitted.

A detailed configuration of the image stabilization apparatus 30 to which the position detecting apparatus in this embodiment is applied is explained below with reference to FIGS. 3 to 8 and the like.

Figure 3:
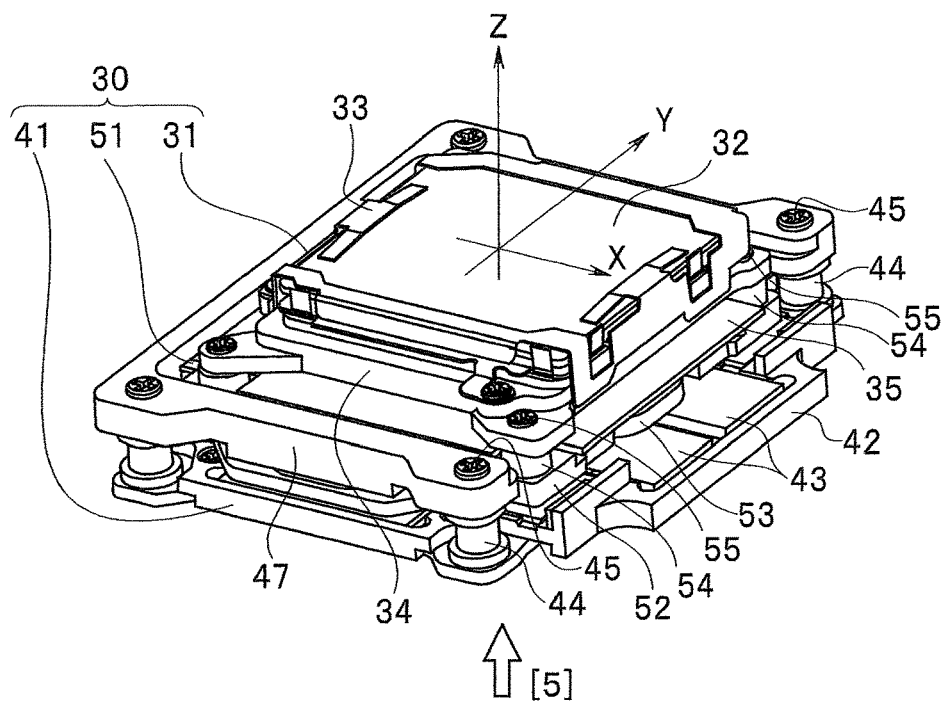
FIG. 3 is an exterior perspective view of the image stabilization apparatus to which the position detecting apparatus in the embodiment of the present invention is applied.
Figure 4:
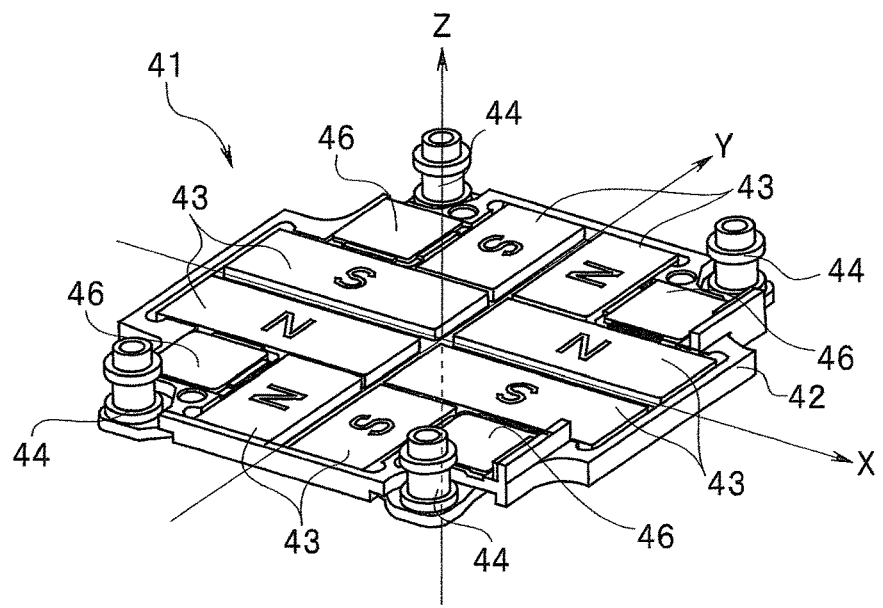
FIG. 4 is an exterior perspective view showing a fixed section in the image stabilization apparatus shown in FIG. 3.
Figure 5:
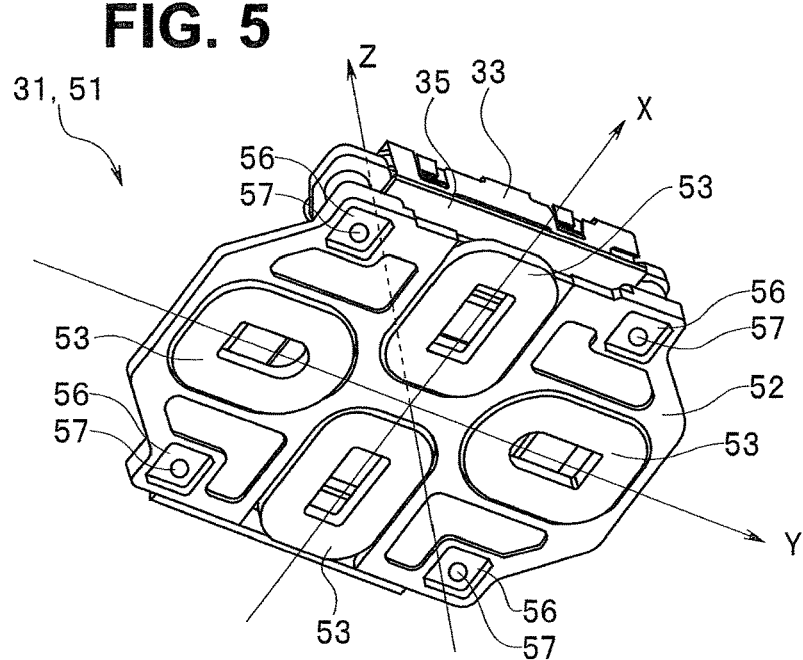
FIG. 5 is an exterior perspective view showing a state in which a movable section on which an image pickup unit is mounted of the image stabilization apparatus shown in FIG. 3 is viewed from an arrow [5] direction (a rear surface side) in FIG. 3.

FIG. 3 is an exterior perspective view of the image stabilization apparatus to which the position detecting apparatus in the embodiment of the present invention is applied. FIG. 4 is an exterior perspective view showing the fixed section in the image stabilization apparatus shown in FIG. 3. FIG. 5 is an exterior perspective view showing the movable section on which the image pickup unit of the image stabilization apparatus shown in FIG. 3 is mounted. Note that FIG. 5 shows the movable section viewed from an arrow [5] direction (a rear surface side) in FIG. 3.

Figure 6:
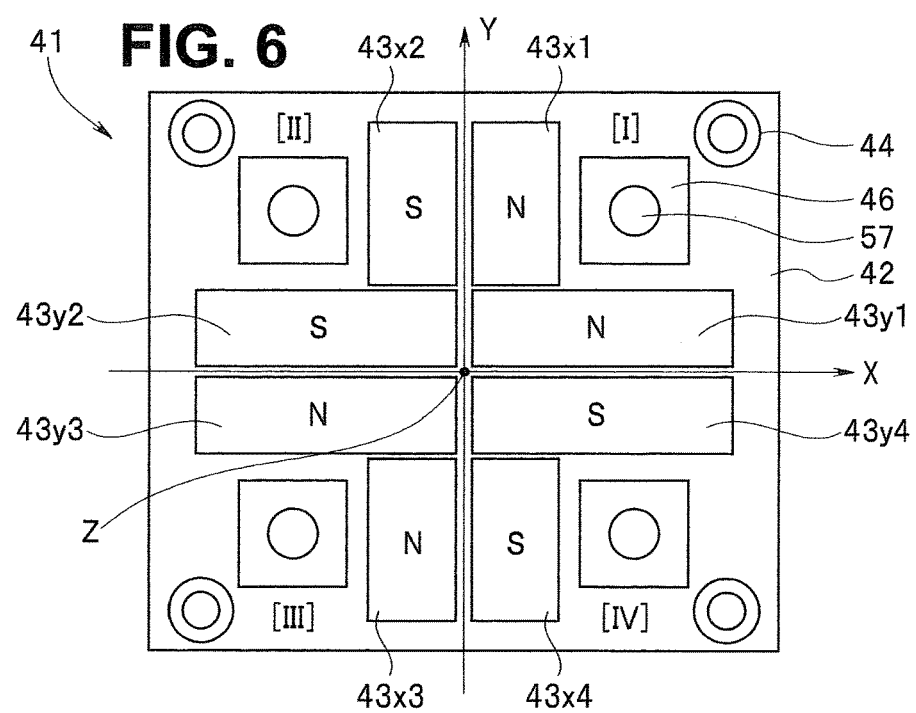
FIG. 6 is a diagram conceptually showing disposition of a plurality of magnets for driving provided in the fixed section shown in FIG. 4.
Figure 7:
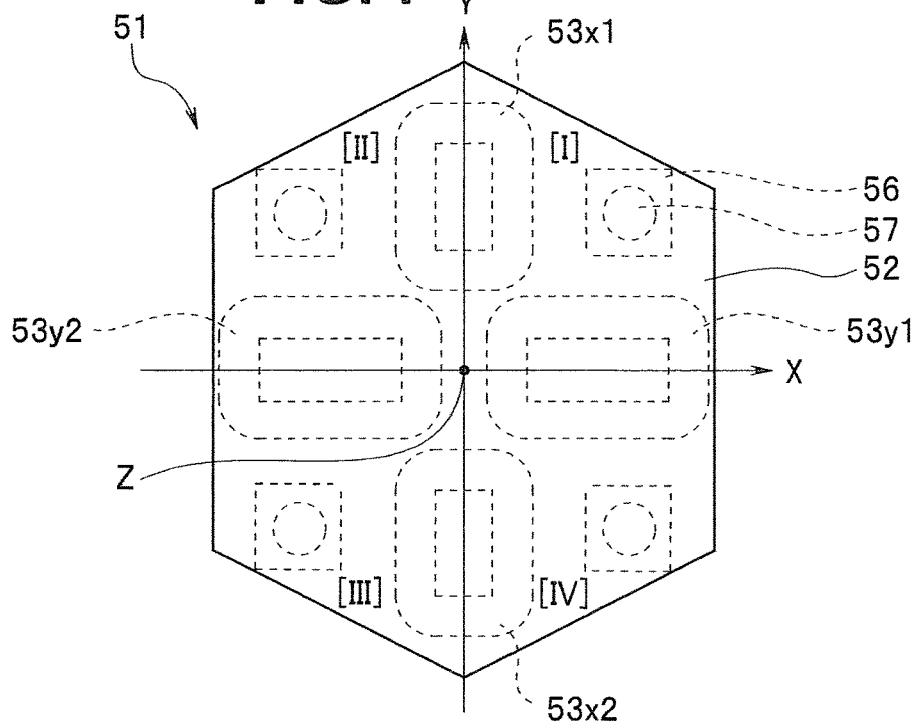
FIG. 7 is a diagram conceptually showing disposition of a plurality of coils for driving provided in the movable section shown in FIG. 5.
Figure 8:
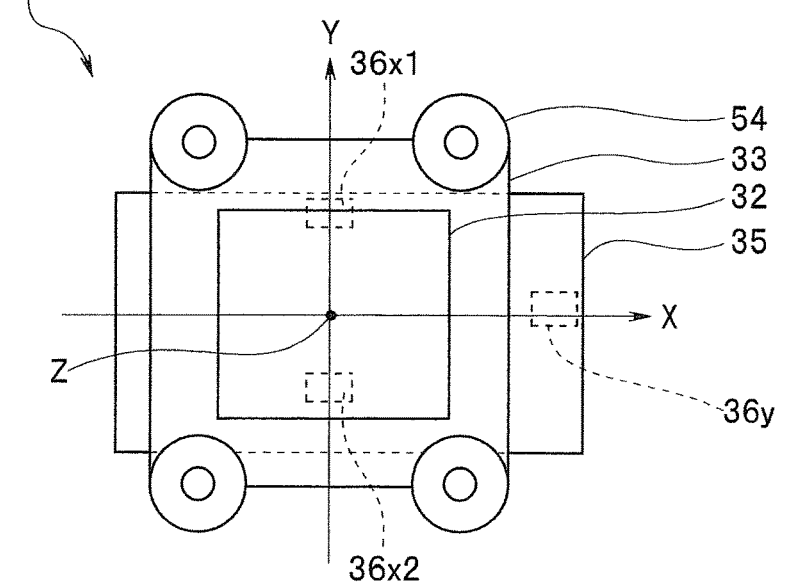
FIG. 8 is a diagram conceptually showing disposition of position detecting members (Hall elements) of the position detecting apparatus in the image pickup unit mounted on the movable section shown in FIG. 5.
Figure 9:
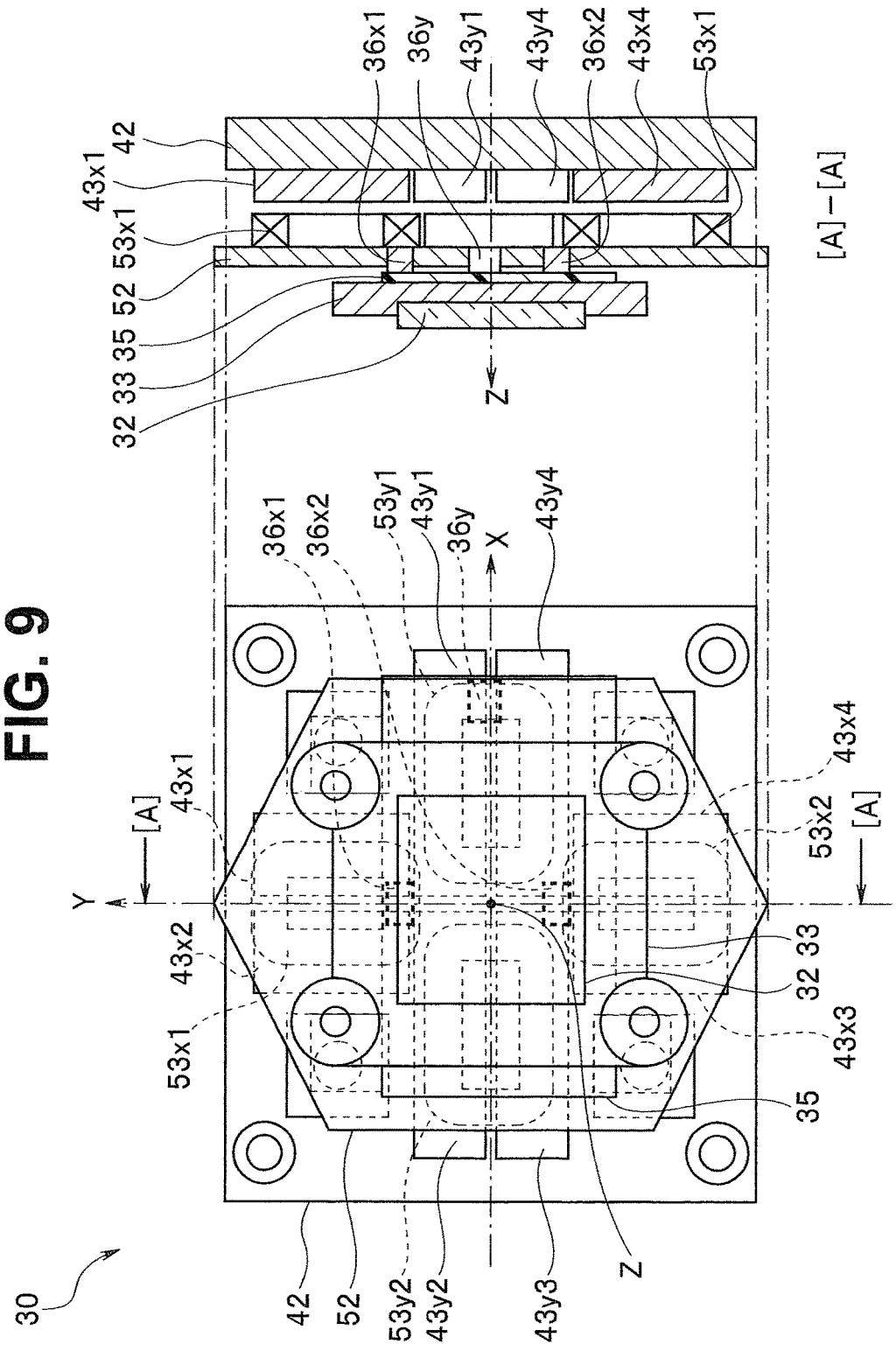
FIG. 9 is a diagram showing a plane (a plane in a superimposed state of FIGS. 6 to 8) of the image stabilization apparatus shown in FIG. 3 viewed from above and a cross section (a cross section taken along an [A]-[A] line) of the image stabilization apparatus.

FIG. 6 is a diagram conceptually showing disposition of a plurality of magnets for driving provided in the fixed section shown in FIG. 4. FIG. 7 is a diagram conceptually showing disposition of a plurality of coils for driving provided in the movable section shown in FIG. 5. FIG. 8 is a diagram conceptually showing disposition of position detecting members (Hall elements) of the position detecting apparatus in the image pickup unit mounted on the movable section shown in FIG. 5. FIG. 9 is a diagram showing a plane (a plane in a superimposed state of FIGS. 6 to 8) of the image stabilization apparatus viewed from above and a cross section (a cross section taken along an [A]-[A] line) of the image stabilization apparatus.

As explained above, the image stabilization apparatus 30 to which the position detecting apparatus in the embodiment of the present invention is applied is the assembly (the constituent unit) for performing the image stabilization processing by moving the movable section 51 on which the image pickup unit 31 is integrally mounted, in the plane orthogonal to the optical axis O (the XY plane) with respect to the fixed section 41.

As shown in FIG. 3 and the like, the image stabilization apparatus 30 is configured mainly by the image pickup unit 31, the movable section 51, the fixed section 41, and the like.

The image pickup unit 31 is configured by an image pickup device 32, which is an optical element to be moved during the image stabilization processing, an image pickup device holder 33, an image pickup base 34, an image pickup board 35, and the like.

The image pickup device 32 is a photoelectric conversion element that sequentially photoelectrically converts optical images formed by the image pickup optical systems (21 to 28) of the lens barrel 20 into image signals and generates image data of a predetermined form. As the image pickup device 32, for example, a CCD image sensor in which a CCD (charge coupled device) is used or an MOS-type image sensor in which a CMOS (complementary metal oxide semiconductor) is used is applied.

The image pickup device holder 33 is a holding member for covering the outer edge of the image pickup device 32 and fixing the image pickup device 32 to the image pickup base 34.

The image pickup base 34 is a basic member that fixes the image pickup device holder 33 to fix and hold the image pickup device 32.

The image pickup board 35 is an electric board including a circuit that controls driving of the image pickup device 32 and performs image signal processing such as photoelectric conversion processing. The image pickup board 35 is fixed to and held by the image pickup base 34.

In this way, it is assumed that, as the configuration of the image pickup unit 31, the same configuration as the configuration of the image pickup unit 31 applied to the general conventional image pickup apparatus is applied. More detailed explanation of the configuration is omitted.

Note that, as explained in detail below, a plurality of Hall elements (36x1, 36x2, and 36y; see FIG. 8 and the like), which are magnetism detecting members configuring a part of the position detecting apparatus in this embodiment, are mounted on the image pickup board 35.

The movable section 51 includes a movable barrel 52 in which a plurality of coils for driving 53 (explained in detail below) of a VCM driving section (explained in detail below) and the image pickup unit 31 (an optical element) are disposed. As explained below, the movable section 51 is a movable member in which the movable barrel 52 is driven in a direction perpendicular to the direction along the optical axis O of the image pickup optical system (the optical element) with respect to the fixed section 41 (explained in detail below; a fixed member) by the VCM driving section (explained in detail below) including magnets for driving 43 and the coils for driving 53.

The movable section 51 is of a form stacked to be parallel to the fixed section 41 (explained in detail below) and configured to be movable in a direction parallel to the plane orthogonal to the optical axis O (the XY plane) with respect to the fixed section 41.

By adopting such a configuration, the image stabilization apparatus 30 performs, on the basis of a predetermined image stabilization signal, control for driving the movable section 51 with respect to the fixed section 41 in a direction in which image blur is cancelled and obtains an image stabilization effect. A basic configuration for the image stabilization apparatus 30 is substantially the same as the configuration in the conventional image stabilization apparatus. The configuration of the movable section 51 is briefly explained below.

As mainly shown in FIGS. 3 and 5 and the like, the movable section 51 is a movable member configured by the movable barrel 52, the plurality of coils for driving 53, coupling members 54, ball receiving sections 56, balls 57, and the like.

The movable barrel 52 is a basic constituent section of the movable section 51 and is a member formed by a substantially flat member as a whole. In the movable barrel 52, the image pickup unit 31 is integrally held on one surface in a stacked form. The plurality of coils for driving 53 configuring a part of the VCM driving section (explained in detail below) are fixed on the other surface.

Note that one surface (the surface on which the image pickup unit 31 is held) of the movable barrel 52 is referred to as upper surface. The other surface (the surface on which the coils for driving 53 are fixed) of the movable barrel 52 is referred to as lower surface.

The coupling members 54 are bar-like members that couple the movable barrel 52 and the image pickup base 34 of the image pickup unit 31. One ends of the coupling members 54 are erected at four corner portions on the upper surface side of the movable barrel 52. The other ends of the coupling members 54 are in contact with and support four corner portions of the image pickup base 34 of the image pickup unit 31. The four corner portions of the image pickup base 34 are fixed and supported from the distal end side of the coupling members 54 using screws 55. Consequently, the image pickup unit 31 is integrally fixed and held in a stacked state substantially in parallel to the movable barrel 52 on the upper surface side of the movable barrel 52.

In this case, as explained above, the light receiving surface of the image pickup device 32 is disposed to be parallel to the surface orthogonal to the optical axis O, that is, the XY plane. The movable barrel 52 is disposed such that a moving direction of the movable barrel 52 is substantially parallel to the light receiving surface of the image pickup device 32. Consequently, the moving direction of the movable barrel 52 and the light receiving surface of the image pickup device 32 are configured to be substantially parallel.

The ball receiving sections 56 having a flat shape are respectively formed near the four corner portions on the lower surface side of the movable barrel 52. The ball receiving sections 56 are formed to have plane sections parallel to the light receiving surface of the image pickup device 32 (the XY plane). The balls 57 are respectively disposed in the ball receiving sections 56. The balls 57 are held between the plane sections of the ball receiving sections 56 and ball plates 46 (explained below) on a fixed barrel 42 (explained below) side. Consequently, the movable section 51 is configured to always smoothly move in a predetermined movement plane (the XY plane) with respect to the fixed section 41.

Note that, although not shown in the figure, for example, the movable barrel 52 may be urged to the fixed barrel 42 by a plurality of coil-like springs (not shown in FIGS. 3 and 5 and the like) such that the movable barrel 52 can move in a direction perpendicular to an optical axis with respect to the fixed barrel 42. In this case, the plurality of urging springs urge the movable barrel 52 toward the fixed barrel 42 side via the balls 57 while maintaining the parallel state of the movable barrel 52 and the fixed barrel 42. Consequently, the movable barrel 52 is configured to be capable of always smoothly moving in a predetermined plane (the XY plane orthogonal to the optical axis O) with respect to the fixed barrel 42.

A plurality of yokes for magnetically urging may be disposed in the movable barrel 52. The yokes may configure magnetic springs attracted by the plurality of magnets for driving 43 disposed in the fixed barrel 42 to thereby urge the movable barrel 52 toward the fixed barrel 42 side via the balls 57 while maintaining the parallel state of the movable barrel 52 and the fixed barrel 42.

The VCM driving section is a driving unit for driving the movable section 51. The VCM driving section in the image stabilization apparatus 30 is a driving unit in which a magnetic actuator of a voice coil motor (VCM) type is used. The VCM driving section is mainly configured by the plurality of coils for driving 53 and the plurality of magnets for driving 43.

The plurality of coils for driving 53 are fixed on the lower surface side of the movable barrel 52. Two of the plurality of coils for driving 53 are disposed in substantially symmetrical positions around the Z axis in a direction along the X axis. Similarly, other two of the plurality of coils for driving 53 are disposed in substantially symmetrical positions around the Z axis in a direction along the Y axis.

The disposition of the plurality of coils for driving 53 is specified as described below. A plane of the movable section 51 viewed from above is as shown in FIG. 7. An orthogonal coordinate system in the XY plane formed by the X axis and the Y axis is considered.

In the orthogonal coordinate system, a coil for driving disposed substantially on the X axis in a region of a first quadrant [I] and a fourth quadrant [IV] is referred to as first coil for driving 53*y*1 (a first coil).

A coil for driving disposed substantially on the X axis in a region of a second quadrant [II] and a third quadrant [III] is referred to as second coil for driving 53*y*2 (a second coil).

A coil for driving disposed substantially on the Y axis in a region of the first quadrant [I] and the second quadrant [II] is referred to as third coil for driving 53*x*1 (a third coil).

A coil for driving disposed substantially on the Y axis in a region of the third quadrant [III] and the fourth quadrant [IV] is referred to as fourth coil for driving 53*x*2.

The first and second coils for driving 53*y*1 and 53*y*2 disposed in the direction along the X axis are coils contributing to movement in the direction along the Y axis of the movable section 51.

The third and fourth coils for driving 53*x*1 and 53*x*2 disposed in the direction along the Y axis are coils contributing to movement in the direction along the X axis of the movable section 51.

Note that air core sections of the respective coils for driving are disposed to face the direction parallel to the optical axis O. The respective coils for driving are arranged and fixed to the movable barrel 52 to be opposite to the plurality of magnets for driving 43 (explained in detail below) provided on the fixed section 41 side when the image stabilization apparatus 30 is assembled.

The fixed section 41 is a constituent unit that includes the plurality of magnets for driving 43 configuring another part of the VCM driving section and is disposed to be opposite to the movable section 51. The fixed section 41 is fixed to a predetermined fixed portion of the apparatus main body 10. The fixed section 41 is disposed in a stacked form on the lower surface side of the movable section 51 to be parallel to the movable section 51. With this configuration, the fixed section 41 is configured to be movable in a direction parallel to the plane orthogonal to the optical axis O (the XY plane) with respect to the movable section 51. A basic configuration of the fixed section 41 is substantially the same as the basic configuration in the conventional image stabilization apparatus. The configuration of the fixed section 41 is briefly explained below.

As mainly shown in FIGS. 3 and 4 and the like, the fixed section 41 is a fixed member configured by the fixed barrel 42, the plurality of magnets for driving 43, columns 44, a cover member 47, ball plates 46, and the like.

The fixed barrel 42 is a basic constituent section of the fixed section 41 and is a member formed by a substantially flat member as a whole. The plurality of magnets 43 configuring another part of the VCM driving section are fixed to one surface of the fixed barrel 42. The other surface is fixed to and supported by a fixed portion (not shown in FIGS. 3 and 4 and the like) of the apparatus main body 10.

Note that one surface (the surface to which the magnets for driving 43 are fixed) of the fixed barrel 42 is referred to as upper surface. The other surface (the fixed surface to the apparatus main body 10) of the fixed barrel 42 is referred to as lower surface.

The cover member 47 is a member provided to cover and protect the fixed section 41 and a part of the outer edge portion of the movable section 51 (in this example, three sides among the outer edge four sides of the movable section 51) while securing a movement region in the XY plane of the movable section 51. The cover member 47 is fixed and supported by the columns 44 and screws 45 provided between the cover member 47 and the fixed barrel 42.

On the upper surface side of the fixed barrel 42, the ball plates 46 having a flat shape are respectively formed near the four corner portions. The ball plates 46 are formed to have plane sections parallel to the light receiving surface of the image pickup device 32 (the XY plane). The ball plates 46 are disposed in positions opposite to the ball receiving sections 56 of the movable section 51 when the image stabilization apparatus 30 is assembled. The balls 57 are held between the ball plates 46 and the ball receiving sections 56.

On the upper surface side of the fixed barrel 42, as explained above, the plurality of magnets for driving 43 configuring another part of the VCM driving section are fixed. As the plurality of magnets for driving 43, magnets having different disposition of magnetic poles are respectively disposed in respective positions opposite to each other with the X axis and the Y axis placed between the positions.

The disposition (the magnetic poles) of the plurality of magnets for driving 43 is specified as explained below. A plane of the fixed section 41 viewed from above is as shown in FIG. 6. An orthogonal coordinate system in the XY plane formed by the X axis and the Y axis is considered.

In the orthogonal coordinate system, two magnets, that is, a magnet for X driving 43y1 disposed along the X axis and a magnet for Y driving 43x1 disposed along the Y axis are disposed in a first quadrant [I]. Respective magnetic poles of the two magnets for driving (43y1 and 43x1) are disposed such that an upper surface side is the N pole.

Two magnets, that is, a magnet for X driving 43y2 disposed along the X axis and a magnet for Y driving 43x2 disposed along the Y axis are disposed in a second quadrant [II]. Respective magnetic poles of the two magnets for driving (43y2 and 43x2) are disposed such that an upper surface side is the S pole.

Two magnets, that is, a magnet for X driving 43y3 disposed along the X axis and a magnet for Y driving 43x3 disposed along the Y axis are disposed in a third quadrant [III]. Respective magnetic poles of the two magnets for driving (43y3, and 43x3) are disposed such that an upper surface side is the N pole.

Two magnets, that is, a magnet for X driving 43y4 disposed along the X axis and a magnet for Y driving 43x4 disposed along the Y axis are disposed in a fourth quadrant [IV]. Respective magnetic poles of the two magnets for driving (43y4 and 43x4) are disposed such that an upper surface side is the S pole.

Two pairs of magnets disposed in the direction along the X axis, that is, a pair of the magnets for X driving 43y1 and 43y4 and a pair of the magnets for X driving 43y2 and 43y3 contribute to movement in the direction along the Y axis of the movable section 51 in cooperation with the first and second coils for driving 53y1 and 53y2.

Two pairs of magnets disposed in the direction along the Y axis, that is, a pair of the magnets for Y driving 43x1 and 43x2 and a pair of the magnets for Y driving 43x3 and 43x4 contribute to movement in the direction along the X axis of the movable section 51 in cooperation with the third and fourth coils for driving 53x1 and 53x2.

On the other hand, as explained above, the plurality of Hall elements (36x1, 36x2, and 36y; see FIG. 8 and the like) are mounted on the image pickup board 35. That is, the plurality of Hall elements are members configuring a part of a position detecting apparatus for detecting positions in the direction along the X axis and the direction along the Y axis and rotation around the Z axis of the movable section 51.

Note that, in this embodiment, an example is explained in which, among the plurality of Hall elements, three Hall elements, that is, two Hall elements (36x1 and 36x2) that detect a position of the movable section 51 in the direction along the X axis and rotation of the movable section 51 around the Z axis and one Hall element (36y) that detects a position of the movable section 51 in the direction along the Y axis are provided.

Among the plurality of Hall elements, the Hall element indicated by the sign 36x1 is referred to as first Hall element (first magnetism detecting member). The Hall element indicated by the sign 36x2 is referred to as second Hall element (second magnetism detecting member). The Hall element indicated by the sign 36y is referred to as third Hall element (third magnetism detecting member).

In this case, the first and second Hall elements 36x1 and 36x2 are disposed on the Y axis and in predetermined respective positions opposite to each other with the Z axis placed between the positions in a plane (the image pickup board 35) parallel to the XY plane. The third Hall element 36y is disposed on the X axis in a plane (the image pickup board 35) parallel to the XY plane.

The plurality of Hall elements are magnetism detecting apparatuses that are disposed in the movable section 51 (a movable member; a member in which a coil for driving is disposed) and detect changes in values of magnetic flux densities of the plurality of magnets for driving 43 at the time when the movable section 51 (the movable member) is driven by the VCM driving section.

That is, the plurality of Hall elements configure a part of a position detecting apparatus that detects the position of the movable section 51 by detecting changes in values of magnetic flux densities of the plurality of magnets for driving 43.

Therefore, the plurality of Hall elements are disposed to be respectively opposite to the plurality of magnets for driving 43 fixed to the upper surface of the fixed section 41.

In this way, the position detecting apparatus in this embodiment is a position detecting apparatus of a magnetism detection type configured by members that generate magnetism (a plurality of magnets; the plurality of magnets for driving 43) and magnetism detecting members (the plurality of Hall elements) that detect intensities of magnetic fields (changes in values of magnetic flux densities) of the magnets.

Note that detailed disposition conditions of the respective plurality of Hall elements (36x1, 36x2, and 36y) are explained below.

Figure 10:
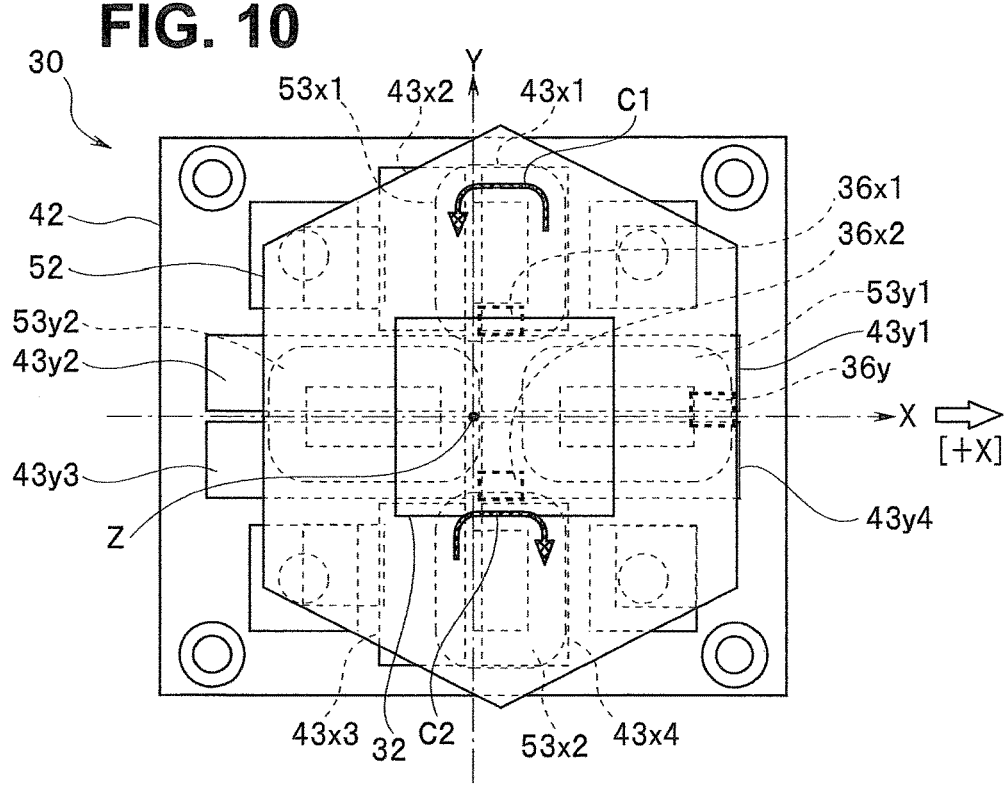
FIG. 10 is a diagram showing the plane of the image stabilization apparatus shown in FIG. 3 viewed from above and showing action in moving the movable section on which the image pickup unit is mounted in a direction along an X axis.
Figure 11:
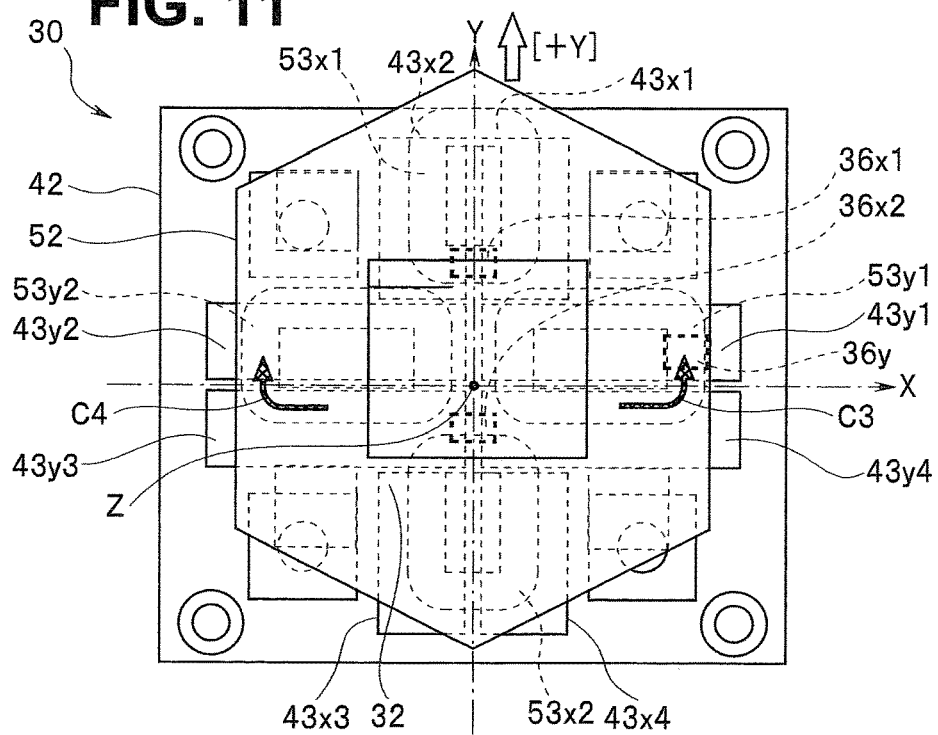
FIG. 11 is a diagram showing the plane of the image stabilization apparatus shown in FIG. 3 viewed from above and showing action in moving the movable section on which the image pickup unit is mounted in a direction along a Y axis.
Figure 12:
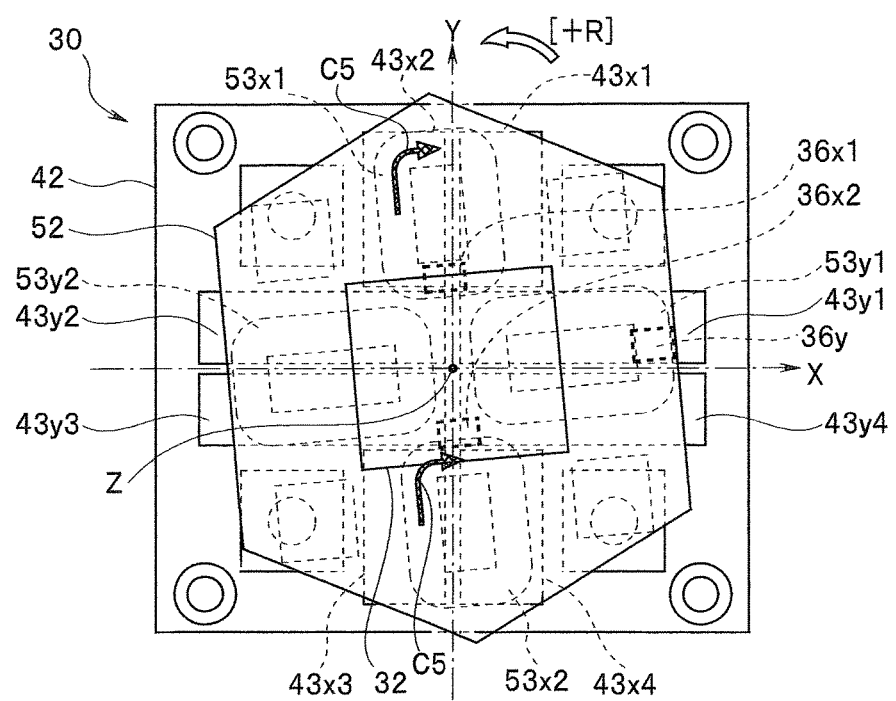
FIG. 12 is a diagram showing the plane of the image stabilization apparatus shown in FIG. 3 viewed from above and showing action in rotating the movable section on which the image pickup unit is mounted around a Z axis.

Action of the image stabilization apparatus 30 configured as explained above is briefly explained below. FIGS. 10 to 12 are diagrams showing the action of the image stabilization apparatus 30 and are plan views of the image stabilization apparatus 30 viewed from above. Among the figures, FIG. 10 is a diagram showing action at the time when the movable section 51 on which the image pickup unit 31 is mounted is moved in the direction along the X axis. FIG. 11 is a diagram showing action at the time when the movable section 51 is moved in the direction along the Y axis. FIG. 12 is a diagram showing action at the time when the movable section 51 is rotated around the Z axis.

First, in the image stabilization apparatus 30, when the movable section 51 on which the image pickup unit 31 is mounted is moved in the direction along the X axis, electric currents in predetermined directions are respectively applied to the third and fourth coils for driving 53x1 and 53x2.

In an example shown in FIG. 10, an electric current in a direction indicated by an arrow sign C1 in FIG. 10 (the counterclockwise direction viewed from above) is applied to the third coil for driving 53x1 and, at the same time, an electric current in a direction indicated by an arrow sign C2

(the clockwise direction viewed from above) in FIG. 10 is applied to the fourth coil for driving 53x2.

Consequently, the movable section 51 on which the image pickup unit 31 is mounted moves in an arrow sign [+ (plus) X] direction in FIG. 10. A moving amount of movable section 51 at this time can be controlled by an amount of applied current.

In this way, the movement in the direction along the X axis of the movable section 51 can be realized by applying electric currents to the third and fourth coils for driving 53x1 and 53x2. At this time, a [+ (plus)] direction and a [- (minus)] direction in the direction along the X axis of the movable section 51 can be controlled by directions of electric currents applied to respective coils corresponding to the directions.

In the image stabilization apparatus 30, when the movable section 51 on which the image pickup unit 31 is mounted is moved in the direction along the Y axis, electric currents in predetermined directions are respectively applied to the first and second coils for driving 53y1 and 53y2.

In an example shown in FIG. 11, an electric current in a direction indicated by a sign C3 in FIG. 11 (the counter-clockwise direction viewed from above) is applied to the first coil for driving 53y1 and, at the same time, an electric current in a direction indicated by an arrow sign C4 in FIG. 11 (the clockwise direction viewed from above) is applied to the second coil for driving 53y2.

Consequently, the movable section 51 on which the image pickup unit 31 is mounted moves in an arrow sign [+ (plus) Y] direction in FIG. 11. A moving amount of movable section 51 at this time can be controlled by an amount of applied current.

In this way, the movement in the direction along the Y axis of the movable section 51 can be realized by applying electric currents to the first and second coils for driving 53y1 and 53y2. At this time, a [+ (plus)] direction and a [- (minus)] direction in the direction along the Y axis of the movable section 51 can be controlled by directions of electric currents applied to respective coils corresponding to the directions.

In the image stabilization apparatus 30, when the movable section 51 on which the image pickup unit 31 is mounted is rotated around the Z axis, electric currents in the same direction are respectively applied to the third and fourth coils for driving 53x1 and 53x2.

In an example shown in FIG. 12, electric currents in a direction indicated by an arrow sign C5 in FIG. 12 (the clockwise direction viewed from above) are respectively applied to the third and fourth coils for driving 53x1 and 53x2.

Consequently, the movable section 51 on which the image pickup unit 31 is mounted rotates in an arrow sign [+ (plus) R] direction in FIG. 12 (the counterclockwise direction viewed from above). A rotating amount of movable section 51 at this time can be controlled by an amount of applied current.

In this way, the rotation around the Z axis of the movable section 51 can be realized by applying electric currents to the third and fourth coils for driving 53x1 and 53x2. At this time, a [+ (plus)] direction (the counterclockwise direction viewed from above) and a [− (minus)] direction (the clockwise direction viewed from above) in a rotating direction around the Z axis of the movable section 51 can be controlled by directions of electric currents applied to the respective coils.

As explained above, the image stabilization apparatus 30 is of a form in which the movable section 51 on which the image pickup unit 31 is mounted is driven by the VCM driving section in which the magnetic actuator of the voice coil motor (VCM) type is used.

As explained above, the position detecting apparatus in this embodiment is the position detecting apparatus of the magnetism detection type configured by the members (the plurality of magnets; the magnets for driving) that generate magnetism and the magnetism detecting members (the plurality of Hall elements) that detect magnetic fields of the magnet.

Therefore, it is necessary to prevent magnetic fields of the coils for driving configuring the VCM driving section from mixing as noise components in the magnetism detecting member of the position detecting apparatus.

In the position detecting apparatus in this embodiment, disposition conditions of the plurality of Hall elements (36x1, 36x2, and 36y) are specified as explained below.

The plurality of Hall elements (magnetism detecting members) are disposed in positions where, when electric currents are fed to the coils for driving, magnetic flux densities of the coils for driving do not affect changes in magnetic flux densities due to the magnets for driving in the plane perpendicular to the direction along the optical axis O (the Z axis) (the XY plane).

Therefore, the plurality of Hall elements (magnetism detecting members) are disposed in predetermined positions on an imaginary line where values of magnetic flux densities generated at a time when electric currents are fed to the coils for driving are zero (O) in the direction along the optical axis O (the Z axis).

Figure 13:
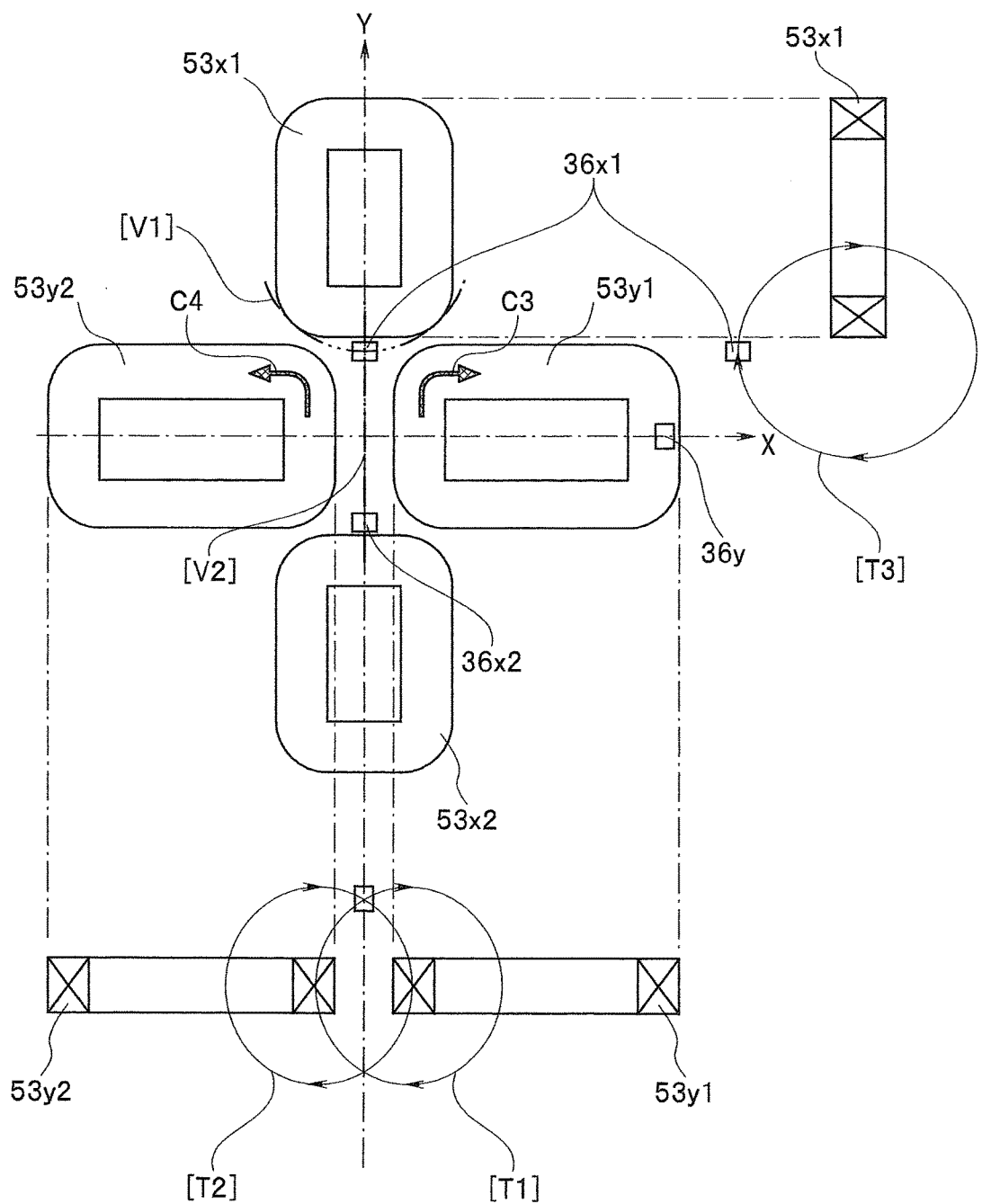
FIG. 13 is a diagram conceptually showing disposition in the image stabilization apparatus of a plurality of coils for driving and a plurality of Hall elements provided in the movable section of the image stabilization apparatus shown in FIG. 3 (a diagram showing a plane viewed from above and a cross section of a part of coils (first to third))

FIG. 13 is a diagram conceptually showing disposition in the image stabilization apparatus 30 of the plurality of coils for driving (53x1, 53x2, 53y1, and 53y2) and the plurality of Hall elements (36x1, 36x2, and 36y) provided in the movable section 51. Note that, in FIG. 13, a plane viewed from above and a cross section of a part of the coils (first to third) are shown.

When electric currents are fed to the plurality of coils for driving 53, magnetic fluxes are generated from the respective coils for driving. At this time, as FIG. 13 shows, the plurality of Hall elements are affected by magnetic fields of the plurality of coils for driving disposed near the plurality of Hall elements.

Specifically, for example, the first Hall element 36x1 is disposed in a position affected by magnetic fields respectively generated from the third coil for driving 53x1 and the first and second coils for driving 53y1 and 53y2.

First, the influence of the magnetic field of the third coil for driving 53x1 on the first Hall element 36x1 is considered.

Figure 14:
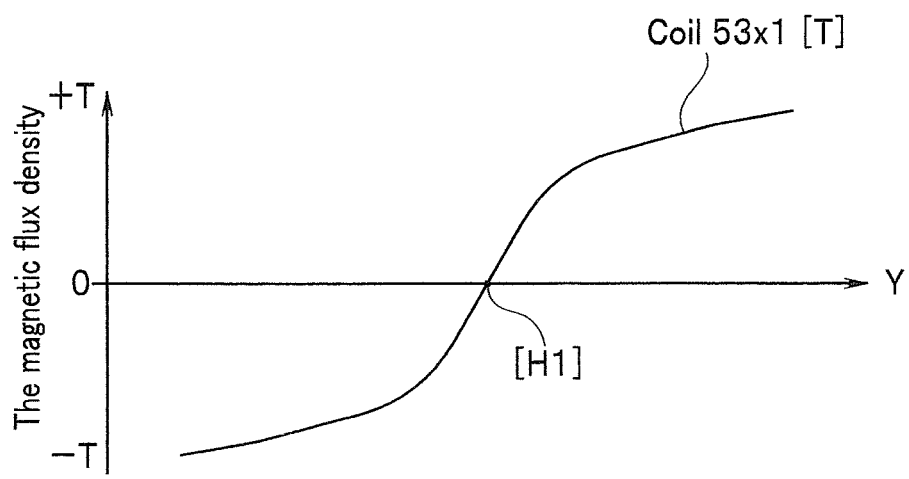
FIG. 14 is a diagram showing a transition of a value of magnetic flux density on a line parallel to the Y axis of a magnetic flux generated from a third coil for driving of the image stabilization apparatus shown in FIG. 3.

When an electric current is fed to the third coil for driving 53x1, a magnetic flux indicated by a sign [T3] in FIG. 13 is generated in the third coil for driving 53x1. FIG. 14 is a diagram showing a transition of a value of magnetic flux density on a line parallel to the Y axis of the magnetic flux [3] generated from the third coil for driving 53x1.

As FIG. 14 shows, a position [H1] where a component of magnetic flux density in the direction along the Z axis is zero (0) (i.e., a position where the magnetic flux [T3] is parallel to the XY plane) is present on a line parallel to the Y axis in the magnetic flux [T3] generated from the third coil for driving 53x1. A plurality of such positions [H1] are present on the line parallel to the Y axis.

An imaginary line (an alternate long and two dashes line) indicated by a sign [V1] in FIG. 13 is an imaginary line formed by connecting the positions [H1] where a component of magnetic flux density in the direction along the Z axis is zero (0) on the line parallel to the Y axis in the magnetic flux

[T3] generated from the third coil for driving 53x1 (hereinafter abbreviated as positions [H1]).

It is seen from the above that, if the first Hall element 36x1 is disposed on the imaginary line [V1], it is possible to avoid the influence of the magnetic field of the third coil for driving 53x1 on the first Hall element 36x1.

The influence of magnetic fields of the first and second coils for driving 53y1 and 53y2 on the first Hall element 36x1 is considered.

An electric current in a direction indicated by an arrow sign C3 in FIG. 13 is fed to the first coil for driving 53y1. Then, a magnetic flux indicated by a sign [T1] in FIG. 13 is generated in the first coil for driving 53y1. Similarly, an electric current in a direction indicated by an arrow sign C4 in FIG. 13 is fed to the second coil for driving 53y2. Then, a magnetic flux indicated by a sign [T2] in FIG. 13 is generated in the second coil for driving 53y2.

Figure 15:
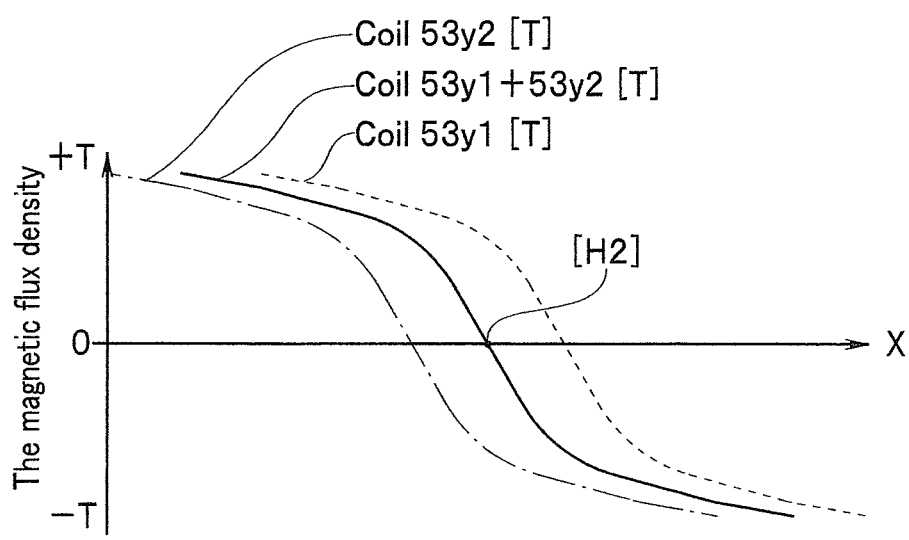
FIG. 15 is a diagram showing transitions of values of magnetic flux densities on a line parallel to the X axis of magnetic fluxes respectively generated from first and second coils for driving of the image stabilization apparatus shown in FIG. 3 and a transition of a value of a sum of the magnetic flux densities of both of the magnetic fluxes.

FIG. 15 is a diagram showing transitions of values of magnetic flux densities on a line parallel to the X axis of magnetic fluxes [T1] and [T2] respectively generated from the first and second coils for driving 53y1 and 53y2 and a transition of a value of a sum of the magnetic flux densities of both of the magnetic fluxes.

Note that, in FIG. 15, a chain line indicates a transition of a value of magnetic flux density on a line parallel to the X axis of the magnetic flux [T1] of the first coil for driving 53y1. An alternate long and short dash line indicates a transition of a value of magnetic flux density on the line parallel to the X axis of the magnetic flux [T2] of the second coil for driving 53y2. A solid line indicates a transition of a sum of the values of the magnetic flux densities on the line parallel to the X axis of the magnetic fluxes [T1] and [T2].

As FIG. 15 shows, a position [H2] where a sum of components of magnetic flux densities in the direction along the Z axis of the magnetic fluxes [T1] and [T2] generated from the first and second coils for driving 53y1 and 53y2 is zero (0) (i.e., cancelled) is present. A plurality of such positions [H2] are present on a line parallel to the X axis.

An imaginary line (an alternate long and two dashes line) indicated by a sign [V2] in FIG. 13 is an imaginary line formed by connecting the positions [H2] where the sum of the components of the magnetic flux densities in the direction along the Z axis of the magnetic fluxes [T1] and [T2] of the first and second coils for driving 53y1 and 53y2 is zero (0) (hereinafter abbreviated as positions [H2]).

The above shows that, if the first Hall element 36x1 is disposed on the imaginary line [V2], it is possible to avoid the influence of the magnetic fields of the first and second coils for driving 53y1 and 53y2 on the first Hall element 36x1.

Therefore, in order to avoid the influence of the respective magnetic fields of the third coil for driving 53x1 and the first and second coils for driving 53y1 and 53y2 on the first Hall element 36x1, the first Hall element 36x1 only has to be disposed at an intersection of the imaginary lines [V1] and [V2] (see FIG. 13).

By specifying such disposition conditions, the first Hall element 36x1 (magnetism detecting member) can be disposed in a position where, when electric currents are fed to the coils for driving 53, magnetic flux densities of the coils for driving 53 do not affect changes in magnetic flux densities due to the magnets for driving in the plane perpendicular to the direction along the optical axis O (the Z axis) (the XY plane).

Note that the disposition of the second Hall element 36x2 only has to be set by completely the same manner as in the first Hall element 36x1.

In this case, the first Hall element 36x1 and the second Hall element 36x2 are disposed in predetermined positions opposite to each other with the Z axis placed between the positions on a line parallel to the Y axis in a plane parallel to the XY plane.

Both of the first and second Hall elements 36x1 and 36x2 are disposed in positions near a substantial center point (the Z axis; the origin) of a movement target object (in this embodiment, the image pickup device 32 of the image pickup unit 31).

On the other hand, disposition conditions of the third Hall element 36y are specified as explained below.

When an electric current is fed to the plurality of coils for driving 53, the third Hall element 36y is disposed in a position where the third Hall element 36y is affected by only a magnetic field generated from the first coil for driving 53y1. Therefore, the influence of the magnetic field of the first coil for driving 53y1 on the third Hall element 36y only has to be considered.

The influence of the magnetic field of the first coil for driving 53y1 on the third Hall element 36y is substantially the same as the influence of the magnetic field of the third coil for driving 53x1 on the first Hall element 36x1 explained above.

Therefore, if the third Hall element 36y is disposed in a position where a component of magnetic flux density in the direction along the Z axis is zero (0) on the line parallel to the X axis of the magnetic flux generated from the first coil for driving 53y1, it is possible to avoid the influence of the magnetic field of the first coil for driving 53y1 on the third Hall element 36y.

As explained above, according to the embodiment, in the position detecting apparatus applied to the optical image stabilization apparatus 30 of the form for performing the image stabilization processing by moving the movable section 51 on which the image pickup device 32 which is a movement target object is mounted, with respect to the fixed section 41 using the driving mechanism of the voice coil motor (VCM) type, the plurality of Hall elements (36x1, 36x2, and 36y; magnetism detecting members) are configured to be disposed in predetermined positions on an imaginary line where values of magnetic flux densities generated at a time when electric currents are fed to the coils for driving are zero (0) in the direction along the optical axis O (the Z axis).

With such a configuration, the plurality of Hall elements of the position detecting apparatus are not affected by magnetic fields generated from the coils for driving of the VCM driving section. Therefore, even in the position detecting apparatus of the magnetism detection type, it is possible to always secure high position detection accuracy. It is possible to contribute to a reduction in the sizes of an image stabilization apparatus to which the position detecting apparatus is applied and an image pickup apparatus on which the image stabilization apparatus is mounted.

[Modification]

In the embodiment explained above, among the plurality of coils for driving in the position detecting apparatus, for example, the pair of coils for driving (the third coil for driving 53x1 and the fourth coil for driving 53x2) disposed on the X axis and contributing to movement in the direction along the Y axis of the movable section 51 is configured in substantially the same size. The pair of coils for driving (the first coil for driving 53y1 and the second coil for driving 53y2) disposed on the Y axis and contributing to movement in the direction along the X axis of the movable section 51 is configured in substantially the same size.

However, depending on an internal layout of the image stabilization apparatus 30, the respective pairs of coils for driving are configured in different sizes. A modification explained below is an illustration of disposition of the Hall elements of the position detecting apparatus in the case in which the sizes of the plurality of coils for driving of the VCM driving section are different.

Figure 16:
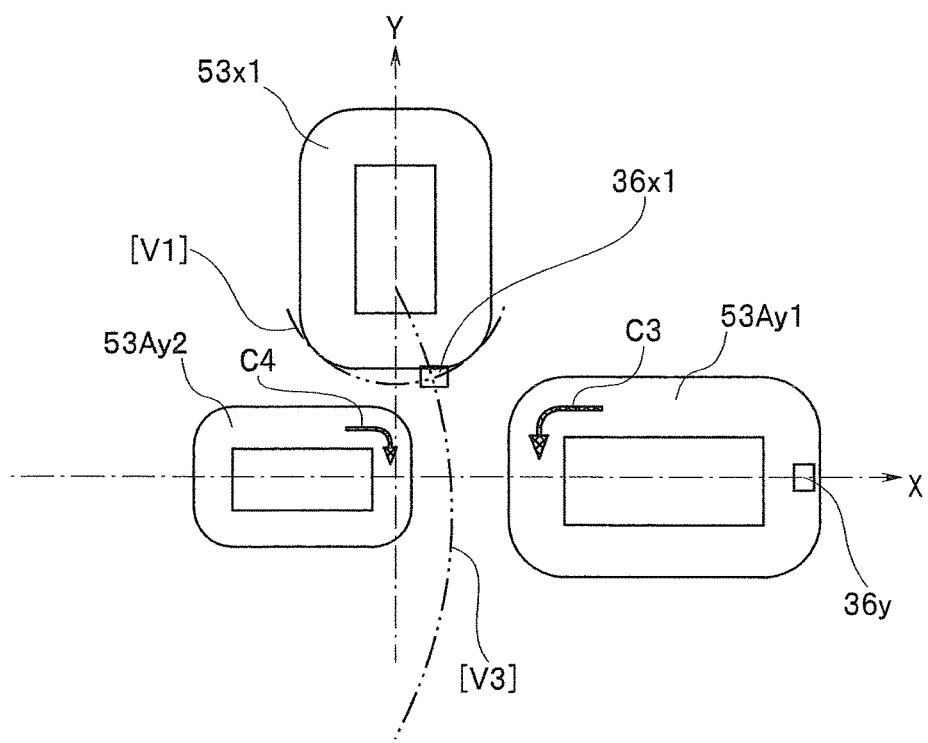
FIG. 16 is a conceptual diagram showing a modification of the position detecting apparatus in the embodiment of the present invention.

FIG. 16 is a conceptual diagram showing a modification of the position detecting apparatus in the embodiment of the present invention. That is, FIG. 16 is a diagram conceptually showing disposition in the image stabilization apparatus of a part of the plurality of coils for driving provided in the movable section and the Hall elements disposed in positions that may be affected by magnetic fields of the plurality of coils for driving in the image stabilization apparatus to which the position detecting apparatus is applied. Note that FIG. 16 is a diagram corresponding to FIG. 13 in the embodiment explained above.

A basic configuration of this modification is the same as the basic configuration in the embodiment. This modification is only different from the embodiment in a part (53Ay1 and 53Ay2) of a plurality of coils for driving provided in a movable section of an image stabilization apparatus to which the position detecting apparatus is applied and the disposition of the Hall element (36x1) specified according to the plurality of coils for driving. Therefore, in the following explanation, illustration and detailed explanation of the same components as the components in the embodiment are omitted. Only differences from the embodiment are explained in detail.

As shown in FIG. 16, in this modification, sizes of coils of a pair of coils for driving (a first coil for driving 53Ay1 and a second coil for driving 53Ay2) disposed on the X axis and contributing to movement in the direction along the Y axis of the movable section 51 among the plurality of coils for driving are different.

Specifically, in this modification, as shown in FIG. 16, the second coil for driving 53Ay2 is configured in small size as compared with the first coil for driving 53Ay1.

In this case, the first coil for driving 53Ay1 and the second coil for driving 53Ay2 are disposed on the X axis as in the embodiment. However, in this modification, the first coil for driving 53Ay1 and the second coil for driving 53Ay2 are disposed in positions deviating to one side (specifically, a region closer to the first and fourth quadrants), in a state where the Y axis is the center.

On the other hand, a pair of coils for driving contributing to movement in the direction along the X axis of the movable section 51 among the plurality of coils for driving is disposed on the Y axis. Note that, in FIG. 16, only the third coil for driving 53x1 is shown. The sizes and the disposition of coils of a pair of coils for driving including the third coil for driving 53x1 are the same as the sizes and the disposition in the embodiment.

When electric currents are fed to the respective coils for driving, the first Hall element 36x1 is disposed in a position affected by magnetic fields respectively generated from the third coil for driving 53x1 and the first and second coils for driving 53Ay1 and 53Ay2.

The disposition of the first Hall element 36x1 is specified as explained in the embodiment. That is, first, the influence of a magnetic field of the third coil for driving 53x1 on the first Hall element 36x1 is the same as the influence in the embodiment.

Therefore, if the first Hall element 36x1 is disposed on an imaginary line [V1] (see FIG. 16) formed by connecting positions where a component of magnetic flux density in the direction along the Z axis is zero (0) on a line parallel to the Y axis in a magnetic flux generated from the third coil for driving 53x1, it is possible to avoid the influence of the magnetic field of the third coil for driving 53x1 on the first Hall element 36x1.

On the other hand, the influence of magnetic fields of the first and second coils for driving 53Ay1 and 53Ay2 on the first Hall element 36x1 is as explained below.

An imaginary line [V3] formed by connecting positions where a sum of magnetic flux densities in the direction along the Z axis is zero (0) (i.e., cancelled) on a line parallel to the X axis of each magnetic flux of the first and second coils for driving 53Ay1 and 53Ay2 is formed into an arcuate convex shape toward the first coil for driving 53Ay1 side as shown in FIG. 16. This is because, since the sizes of the first and second coils for driving 53Ay1 and 53Ay2 are different, intensities (values of magnetic flux densities) of magnetic fields respectively generated in the respective coils for driving are different.

Therefore, if the first Hall element 36x1 is disposed on the imaginary line [V3], it is possible to avoid the influence the magnetic fields of the first and second coils for driving 53y1 and 53y2 on the first Hall element 36x1.

In order to avoid the influence of respective magnetic fields of the third coil for driving 53x1 and the first and second coils for driving 53Ay1 and 53Ay2 on the first Hall element 36x1, the first Hall element 36x1 only has to be disposed at an intersection (see FIG. 16) of the imaginary lines [V1] and [V3]. Note that the disposition of the other Hall element among the plurality of Hall elements only has to be set by the same manner as in the embodiment.

By specifying such disposition conditions, the first Hall element 36x1 (the magnetism detecting section) can be disposed in a position where, when electric currents are fed to the respective coils for driving, magnetic flux densities of the respective coils for driving do not affect changes in the magnetic flux densities due to the respective magnets for driving in the plane perpendicular to the direction along the optical axis O (the Z axis) (the XY plane).

According to the modification having such a configuration, even when an internal layout of the image stabilization apparatus is different, it is possible to obtain completely the same effect as the effect in the embodiment by adapting the disposition of the position detecting member of the position detecting apparatus as appropriate.

Note that, in the embodiment and the modification, the movable barrel 52 is provided in which the magnets for driving 43 (the magnets) are disposed in the fixed section 41 (the fixed member) and the coils for driving 53 (the coils), the image pickup device 32 (the optical element), and the plurality of Hall elements (magnetism detecting members) are disposed in the movable section 51 (the movable member). However, the invention is not limited to this form.

For example, the movable barrel 52 may be provided in which the coils for driving 53 (the coils) and the plurality of Hall elements (magnetism detecting members) are disposed in the fixed section 41 (the fixed member) and the magnets for driving 43 (the magnets) and the image pickup device 32 (the optical element) are disposed in the movable section 51 (the movable member).

In the embodiment, the position detecting apparatus applied to the image stabilization apparatus 30 mounted in the apparatus main body 10 of the image pickup apparatus 1 is explained as the example. However, an apparatus to which the position detecting apparatus of the present invention can be applied is not limited to the apparatus of this form.

Figure 17:
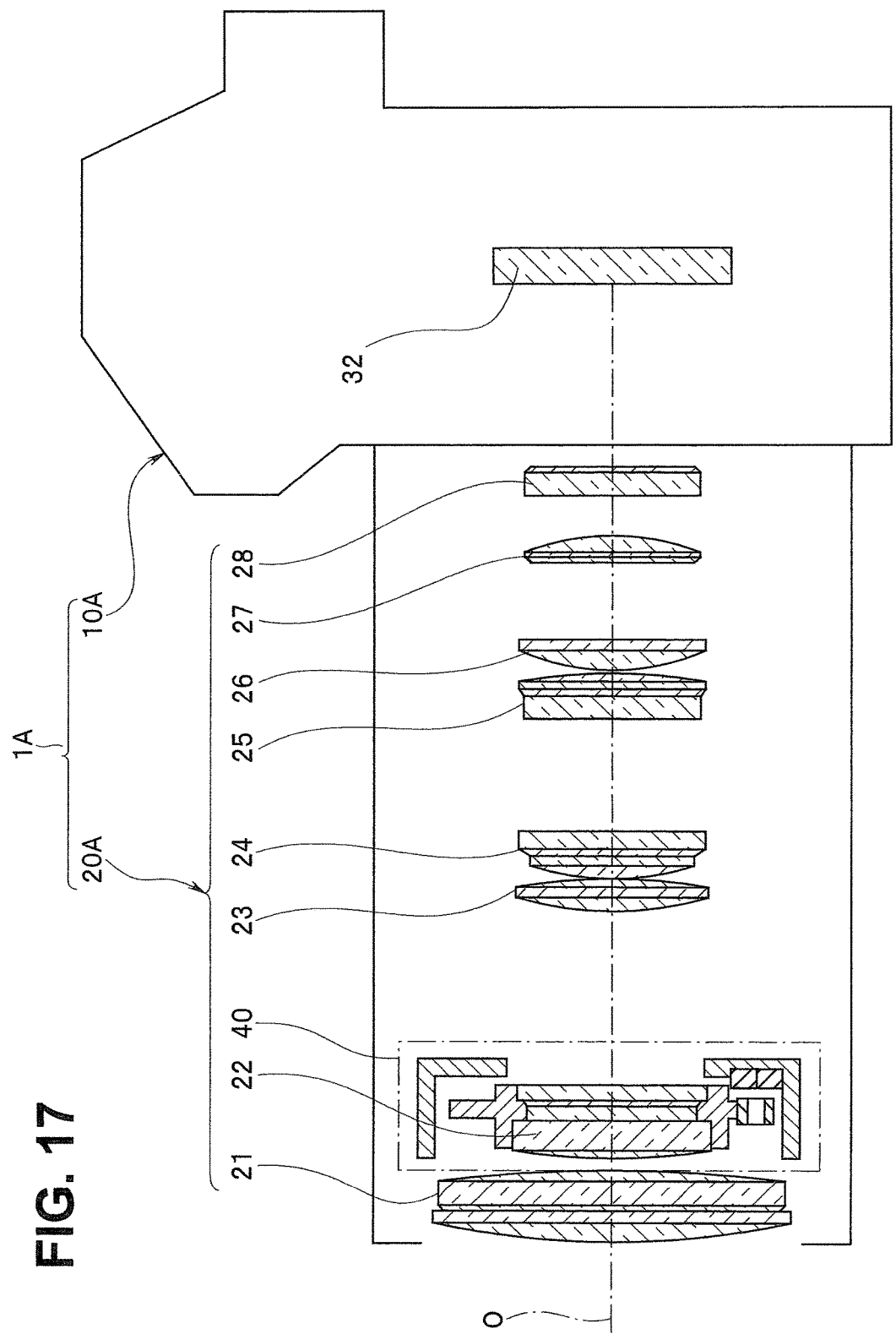
FIG. 17 is a conceptual diagram showing a schematic configuration of another for n of the image pickup apparatus to which the present invention is applied.

That is, besides the form in the embodiment (the form in which the position detecting apparatus is applied to the optical image stabilization apparatus 30 provided on the apparatus main body 10 side), as shown in FIG. 17, the position detecting apparatus of the present invention can also be applied to an optical image stabilization apparatus 40 provided on the side of a lens barrel 20A attached to an apparatus main body 10A of another image pickup apparatus 1A. As the other image pickup apparatus 1A, an image pickup apparatus of a form not including an image stabilization apparatus in the apparatus main body 10A is illustrated.

When this configuration is adopted, as shown in FIG. 17, an optical element disposed in the movable section driven by the VCM driving section of the image stabilization apparatus 40 is a part of the optical lens group 22 of the image pickup optical system.

The optical image stabilization apparatus 40 provided on the lens barrel 20A side shifts a part of the optical lens group 22 of the image pickup optical system on the XY plane with respect to the optical axis O to thereby stabilize an image blur that occurs at a time when a camera rotates around the X axis and the Y axis.

The position detecting apparatus of the present invention can also be applied to the image stabilization apparatus 40 of such a form in completely the same manner.

Further, the position detecting apparatus of the present invention can also be applied to an image pickup apparatus 1B of another faun shown in FIG. 18. That is, the image pickup apparatus 1B of the other form shown in FIG. 18 is illustration of an image pickup apparatus configured by combining the apparatus main body 10 in the embodiment explained above and the lens barrel 20A explained above.

In the case of the configuration in which the optical image stabilization apparatuses 30 and 40 are respectively included in the apparatus main body 10 of the image pickup apparatus 1 and the lens barrel 20A, the image stabilization processing is performed in a form in which the respective optical image stabilization apparatuses 30 and 40 cooperate and complement with each other. Note that the configuration and the action of the image stabilization processing are not directly related to the present invention. Therefore, detailed explanation of the image stabilization processing is omitted.

Even when such a configuration is adopted, the position detecting apparatus of the present invention can also be applied to the respective image stabilization apparatuses 30 and 40 in completely the same manner.

As explained above, a combination of the image pickup apparatus and the lens barrel may be any combination. That is, the optical image stabilization apparatus may be provided only in the image pickup apparatus (see FIGS. 1 and 2). The optical image stabilization apparatus may be provided only in the lens barrel (see FIG. 17). Further, the lens barrel including the optical image stabilization apparatus may be attached to the image pickup apparatus including the optical image stabilization apparatus (see FIG. 18).

The present invention is not limited to the embodiment explained above. It goes without saying that various modifications and applications can be implemented without departing from the spirit of the invention. Further, inventions at various stages are included in the embodiment. Various inventions can be extracted according to appropriate combinations of a disclosed plurality of constituent features. For example, when the problems to be solved by the invention can be solved and the effects of the invention can be obtained even if several constituent features are deleted from all the constituent features explained in the embodiment, a configuration from which the constituent features are deleted can be extracted as an invention. Further, constituent features in different embodiments may be combined as appropriate. The present invention is not limited by a specific implementation mode of the invention except that the invention is limited by the appended claims.

The present invention is not limited to only an image pickup apparatus specialized for an image pickup function. The present invention can be widely applied to electronic apparatuses of other forms including the image pickup function, for example, various electronic apparatuses with the image pickup function such as a digital camera, a video camera, a movie camera, a cellular phone, a smartphone, an electronic notebook, an electronic dictionary, a portable information terminal, a personal computer, a tablet terminal apparatus, a game apparatus, a television receiver, a clock, and a navigation apparatus that makes use of a GPS (global positioning system).

Further, the present invention can also be applied to electronic apparatuses having a function of acquiring an image using an image pickup device and displaying the acquired image using a display apparatus, for example, observation apparatuses such as a telescope, binoculars, a monocular, and a microscope.

Besides industrial or medical observation apparatuses such as an endoscope and a microscope, the present invention can also be applied to, for example, image pickup apparatuses such as a monitoring camera and a vehicle-mounted camera.

In addition to the above, the present invention can also be applied to a projection-type image display apparatus and the like that enlarge and project images using, for example, a transmission-type liquid crystal display apparatus.

What is claimed is:

1. A position detecting apparatus comprising:
a fixed member in which one of a magnet and a coil is disposed;
a movable member including a movable barrel in which an optical element and the other of the magnet and the coil are disposed, the movable barrel being driven in a direction perpendicular to a direction along an optical axis of the optical element with respect to the fixed member by a VCM driving section including the magnet and the coil; and
a magnetism detecting member disposed in the one of the movable member and the fixed member in which the coil is disposed, the magnetism detecting member detecting a change in a magnetic flux density of the magnet at a time when the movable member is driven,
wherein the magnetism detecting member is disposed, in a plane perpendicular to a direction along the optical axis, in a position where (i) a magnetic flux density of the coil does not affect the change in the magnetic flux density due to the magnet when an electric current is fed to the coil, and (ii) a value of a magnetic flux density generated at a time when the electric current is fed to the coil is zero in the direction along the optical axis.

2. An image stabilization apparatus comprising the position detecting apparatus according to claim 1.

3. A position detecting apparatus comprising:
a fixed member in which one of a magnet and a coil is disposed;
a movable member including a movable barrel in which an optical element and the other of the magnet and the coil are disposed, the movable barrel being driven in a direction perpendicular to a direction along an optical axis of the optical element with respect to the fixed member by a VCM driving section including the magnet and the coil; and a magnetism detecting member disposed in the one of the movable member and the fixed member in which the coil is disposed, the magnetism detecting member detecting a change in a magnetic flux density of the magnet at a time when the movable member is driven, wherein the magnetism detecting member is disposed, in a plane perpendicular to a direction along the optical axis, in a position where a magnetic flux density of the coil does not affect the change in the magnetic flux density due to the magnet when an electric current is fed to the coil, and wherein the magnetism detecting member is disposed on an imaginary line on which a value of a magnetic flux density generated at a time when the electric current is fed to the coil is zero in the direction along the optical axis.

4. An image stabilization apparatus comprising the position detecting apparatus according to claim 3.

5. The position detecting apparatus according to claim 3, wherein the imaginary line on which the value of the magnetic flux density is zero in the direction along the optical axis is formed along a side of the coil closest to the optical axis of the optical element.

6. An image stabilization apparatus comprising the position detecting apparatus according to claim 5.

7. A position detecting apparatus comprising:
a fixed member in which one of a set of magnets disposed to be opposite to each other and a set of coils disposed to be opposite to each other is disposed;
a movable member in which an optical element and the other of the set of magnets and the set of coils are disposed, the movable member moving in a plane orthogonal to an optical axis of the optical element; and
a set of magnetism detecting members disposed in the one of the movable member and the fixed member in which the set of coils is disposed, the set of magnetism detecting members detecting a change in a magnetic flux density of each of the magnets of the set of magnets when the movable member is driven,
wherein the set of magnetism detecting members is disposed on a first imaginary line on which a sum of magnetic flux densities in a direction along the optical axis respectively generated from the coils of the set of coils is zero when electric currents in opposite directions to each other are fed to the set of coils.

8. An image stabilization apparatus comprising the position detecting apparatus according to claim 7.

9. The position detecting apparatus according to claim 7, wherein:
when a point on an axis in the direction along the optical axis is set as an origin and an X axis and a Y axis passing the origin and perpendicular to each other are assumed, the set of coils is disposed on the X axis with the origin placed between the coils, and a third coil and a third magnetism detecting member are disposed on the Y axis, and
when projected from the direction along the optical axis, the third magnetism detecting member is disposed on the first imaginary line and in a position where a magnetic flux generated from the third coil crosses a second imaginary line on which a total of components in a direction perpendicular to a surface of an opening section of the third coil is zero.

10. An image stabilization apparatus comprising the position detecting apparatus according to claim 9.

11. The position detecting apparatus according to claim 9, wherein:
the set of coils is disposed on the X axis and includes first and second coils disposed with the origin placed between the first and second coils, a set of long sides of the first and second coils with the X axis placed between the long sides being a set of long sides parallel to the X axis,
the set of magnetism detecting members includes first and second magnetism detecting members, each of which is disposed at an end portion on a side of the origin of each of the first and second coils, and
the first to third magnetism detecting members are disposed in positions at respective vertexes of a triangle.

12. An image stabilization apparatus comprising the position detecting apparatus according to claim 11.

13. The position detecting apparatus according to claim 11, wherein the third magnetism detecting member is disposed in a position where directions of magnetic fluxes of the first and second coils are opposite to each other in the direction along the optical axis and the magnetic fluxes cancel each other.

14. An image stabilization apparatus comprising the position detecting apparatus according to claim 13.

* * * * *